(12) United States Patent
Kodger, Jr.

(10) Patent No.: US 7,684,994 B2
(45) Date of Patent: Mar. 23, 2010

(54) NEXT GENERATION VISIBILITY PACKAGE TRACKING

(75) Inventor: Kenneth E. Kodger, Jr., Laguna Niguel, CA (US)

(73) Assignee: United Parcel Service of America, Inc., Atlanta, GA (US)

( * ) Notice: Subject to any disclaimer, the term of this patent is extended or adjusted under 35 U.S.C. 154(b) by 822 days.

(21) Appl. No.: 11/104,118

(22) Filed: Apr. 12, 2005

(65) Prior Publication Data

US 2006/0229895 A1    Oct. 12, 2006

(51) Int. Cl.
G06Q 10/00    (2006.01)
G05B 19/418   (2006.01)
G06F 9/44     (2006.01)

(52) U.S. Cl. .................. 705/1; 705/67; 705/26; 705/8; 705/7; 235/375; 340/505; 370/352

(58) Field of Classification Search .......... 364/478, 364/446; 705/1, 26, 40, 8
See application file for complete search history.

(56) References Cited

U.S. PATENT DOCUMENTS

| | | | | |
|---|---|---|---|---|
| 5,043,908 | A * | 8/1991 | Manduley et al. | 700/227 |
| 6,047,264 | A * | 4/2000 | Fisher et al. | 705/26 |
| 6,211,781 | B1 * | 4/2001 | McDonald | 340/505 |
| 6,220,509 | B1 * | 4/2001 | Byford | 235/375 |
| 6,285,916 | B1 * | 9/2001 | Kadaba et al. | 700/222 |
| 6,772,130 | B1 * | 8/2004 | Karbowski et al. | 705/26 |
| 6,873,963 | B1 * | 3/2005 | Westbury et al. | 705/8 |
| 7,187,278 | B2 * | 3/2007 | Biffar | 340/539.13 |
| 7,350,694 | B2 * | 4/2008 | Burgess | 235/375 |
| 2003/0055693 | A1 | 3/2003 | Hoffman et al. | |
| 2003/0097287 | A1 | 5/2003 | Franz et al. | |
| 2003/0216969 | A1 | 11/2003 | Bauer et al. | |
| 2004/0031846 | A1 * | 2/2004 | Burgess | 235/375 |
| 2004/0064351 | A1 | 4/2004 | Mikurak | |
| 2004/0124977 | A1 | 7/2004 | Biffar | |
| 2004/0202154 | A1 * | 10/2004 | Aklepi et al. | 370/352 |
| 2004/0243452 | A1 * | 12/2004 | Barton et al. | 705/7 |
| 2005/0149453 | A1 * | 7/2005 | Amling et al. | 705/60 |
| 2005/0154626 | A1 * | 7/2005 | Jones | 705/8 |
| 2005/0251330 | A1 * | 11/2005 | Waterhouse et al. | 701/204 |
| 2005/0251431 | A1 * | 11/2005 | Schmidtberg | 705/6 |
| 2005/0288947 | A1 * | 12/2005 | Mallonee et al. | 705/1 |

FOREIGN PATENT DOCUMENTS

WO    WO 02/26566 A    4/2002

OTHER PUBLICATIONS

International Search Report for PCT/US2006/012947 dated Jul. 10, 2006.

* cited by examiner

*Primary Examiner*—John W Hayes
*Assistant Examiner*—Brian Epstein
(74) *Attorney, Agent, or Firm*—Alston & Bird LLP

(57) ABSTRACT

The present invention involves systems and methods for tracking one or more shipped items that are shipped via a carrier. A set of expected occurrences are established for each item shipped. The items are then shipped and the shipment of the one or more shipped items is monitored for an occurrence of the set of expected occurrences, the occurrence of any non-expected event, and a non-occurrence of any of the set of expected occurrences. If there is the occurrence of any non-expected event or the non-occurrence of any of the set of expected occurrences, then such an event is made available to at least the shipper.

25 Claims, 13 Drawing Sheets

NEXT GENERATION VISIBILITY PACKAGE TRACKING

BACKGROUND OF THE INVENTION

1. Field of the Invention

The field of the invention is using a set of expected event-based occurrences to detect the non-occurrence of an expected event. More specifically, the field of the invention is item (a/k/a "parcel" or "package") delivery by a parcel delivery service (a/k/a "carrier") and systems and methods of tracking one or more items through a package delivery system as they are shipped from a shipper to an intended recipient by the parcel delivery service.

2. Description of Related Art

Package tracking is an integral part of a package delivery service that allows a customer to track goods that they have shipped or that have been shipped to them. The advent of the Internet has allowed commercial carriers such as UPS, FedEx, DHL, etc. to make it possible for customers to track their shipments online. Some businesses have taken package tracking a step further and integrated the package tracking functionality into their internal business systems. Thus, businesses have the ability to trigger business events based upon shipment status information received from a commercial carrier.

The carriers track all items coming into their possession in order to provide information to shippers, intended recipients and/or authorized third-parties as well as for internal use. One way of performing this task is placing machine-readable indicia or devices such as, for example, barcoded labels or radio frequency identification ("RFID") devices on items to be shipped. The carrier scans or reads the machine-readable devices on the packages at pickup and during the delivery cycle (e.g., origin center, intermediate hubs, destination center, delivery, etc.). After each scan, the information is uploaded to servers or mainframe computers that are affiliated with the carrier such that the information is available to respond to inquiries about the status of shipments. This is sometimes known as providing "visibility" for the items. Note that the terms package, parcel and item are used interchangeably herein to describe a tangible article that is shipped from a shipper to an intended recipient by use of a parcel delivery service.

For the most part, package tracking services known in the art operate on a package by package basis and require that a customer query a carrier database with a package tracking number associated with the package to be tracked. As a result, it is difficult for a company with a heavy volume of inbound or outbound shipping to track all its packages currently in transit. Companies are often stuck with the burdensome task of individually tracking large numbers of packages or risk being surprised when an abnormally large number of packages arrive at its loading docks with insufficient help to dispatch it. Though the challenge of individual inquiries for each package has been addressed in part by solutions as provided in U.S. patent application Ser. No. 10/265,079, "Inbound and Outbound Shipment Notification Methods and Systems" by Franz et al. and published on May 22, 2003 as Publication Number US 2003/0097287 A1, which is hereby fully incorporated herein and made a part hereof, the tracking information provided is purely event-driven. Event-based reports available on a carrier's website may not provide sufficient information as to whether the shipments are on-time, potentially delayed or will be delayed from their expected arrival date. Generally, all that is visible on such a website is information about where the package has been and is currently located, but not if it is on the intended route to the customer or if it has been diverted (either intentionally or unintentionally).

In some instances, shippers (a/k/a "clients") may use a client data capture system or automated shipping system in which origin manifest detail is collected, validated, and made available to the delivery service as needed. The origin manifest data may be collected from customers who use automated shipping systems, such as, for example, the UPS OnLine family of products, as well as customers billed through automated methods or those that process parcels through automated means. The origin manifest information is used by the delivery service to facilitate and automate the sorting and loading of packages, and to generate the customer's (generally, the shipper) bill. Origin manifest information may include shipper's name and address, recipient's name and address, class of service, size and weight of the package, shipping cost, etc. Generally, such origin manifest information is uploaded (transmitted) to the delivery service at the time of pickup to facilitate tracking of items detailed on the manifest.

Currently, the process of tracking a package within the operations of a package delivery service from pickup to delivery can be referred to as full visibility tracking. Full visibility tracking is an event-driven method of tracking as the item being tracked goes through a series of physical, keyed, derived and logical scans or reads that identify the item and its location. Tracking begins with an upload of package/parcel level detail (PLD) information or when the machine-readable indicia or device associated with a package is scanned or read at its point of origin, which usually occurs in the origin hub. If a package is scanned or read incorrectly, the system will not "see" it, and it will become invisible. For example, if a loader begins his or her shift and accidentally scans the wrong position bar code or enters incorrect position information for that load, every package scanned by this person will not be tracked accurately by the system. Therefore, there is no visibility. Even though every package is scanned and linked to the unit load device ("ULD"), the tracking system will not supply proper visibility for any of the packages scanned by that loader because the initial load key (e.g., barcode) was scanned was incorrectly. Examples of ULDs are smalls bags, air containers, trailers, airplanes, etc.

Generally, a server-based or mainframe global information repository receives and stores package and ULD level information from diverse package-handling systems within the parcel delivery service's operations such as, for example: local internal package level detail systems or scanning control systems, load handling systems, air hub control systems, trailer forecasting control systems, operations systems, hub and feeder control systems, data acquisition device control systems, legacy system interfaces, etc. The package information includes origin, intermediate, destination and exception scans or reads. The local internal package level detail systems provides the global repository with package scans and ULD linking events. The load handling systems, air hub control systems, trailer forecasting control systems, operations systems, and hub and feeder control systems provide the global repository with ULD events and ULD exceptions. The data acquisition device control systems and the legacy interfaces supply package scans to the global repository. Therefore, package tracking information available to customers may include, for example, one or more of pickup date, origin scans, intermediate (hub) scans, destination scans, delivery scans, delivery date and time, exceptions, shipper number, package tracking number, customer reference numbers, commercial/residential designation, clarified signature, signature image, number of packages in shipment, etc.

Information about packages, including tracking and delivery information, is generally stored by the package delivery service for a designated period of time depending on the type of information. For instance, package delivery information may be stored for 18 months, exception information may be stored nine months, customer reference numbers may be stored for six months, and interim scans and destination scans may be stored for three months. The storage of tracking and delivery information allows the tracking of a particular item to be re-traced as well as providing a database to determine shipping routes that are most efficient in terms of speed and costs.

Currently, package tracking systems are event-based, meaning that they are based on physical, keyed, derived and logical scan or read events. The predictability and consistency of such event-based tracking systems and package distribution systems allow for enhanced visibility. An unsatisfied need therefore exists in the industry for enhanced package tracking methods and systems that overcomes challenges associated with providing only event-based tracking information.

BRIEF SUMMARY OF THE INVENTION

Very generally, the embodiments of the present invention use a predetermined set of expected occurrences that are associated with an item to detect the non-occurrence of one of the expected occurrences and to report the non-occurrence to one or more interested parties. The embodiments of the present invention provide systems and methods to for non-event driven visibility solutions for package tracking. Such non-event visibility includes when an expected scan event doesn't occur, when an expected scan event doesn't occur within an expected date and time frame, when a scan out of its designated or expected location (Standard Location Identification Codes—"SLIC") sequence occurs, when a re-calculated scheduled delivery date is appropriate, and when planned time-in-transit ("TNT") requires validation. The embodiments of the invention provide a customer visibility solution, internal delivery service visibility and issue resolution solutions.

Event-driven data sources, some of which may be pre-existing, are used to supply information including a predetermined set of expected occurrences in the embodiments of this invention, which are used to determine the occurrence of exceptions in the package-transit process. These data sources include, for example, package level detail scans; event-driven tracking/visibility systems; time in transit, including zip code to zip code and building to building; a distribution system's package flows between service buildings and between specific service sorts, including by product (for example, ground shipments and air shipments), building and sort pairs; origin equivalency tables ("OETs") for customized operating plans that may bypass operations facilities; and, sort starts and finish times.

One aspect of the invention is a method of tracking one or more shipped items. The method comprises establishing a set of expected occurrences for each of one or more shipped items, shipping the one or more shipped items and monitoring the shipment of the shipped items for the occurrence of any one of the set of expected occurrences or the non-occurrence of any of the set of expected occurrences, and reporting the non-occurrence of any of the set of expected occurrences.

Another aspect of the invention is a method of tracking one or more shipped items. This method is comprised of establishing a set of expected occurrences for each item shipped. The one or more shipped items are monitored during their shipment for the occurrence of any one of the set of expected occurrences, a non-occurrence of any of the set of expected occurrences, or an occurrence of a non-expected event. If one or more of the non-occurrence of any of the set of expected occurrences and the occurrence of a non-expected event occur, then reporting the non-occurrence of any of the set of expected occurrences or the occurrence of a non-expected event.

Yet another aspect of the invention is a method of providing visibility of one or more shipped items. The method comprises establishing one or more routes for each shipped item from a shipper to a destination, wherein each route is comprised of one or more intermediate points. An expected date of delivery at the destination is then established for each shipped item. An arrival time interval for each intermediate point for recording the arrival of each shipped item is then determined. A departure time interval for each intermediate point for recording the departure of each shipped item is also determined. If each shipped item arrives at one of the intermediate points during the shipped item's associated arrival time interval and departs the intermediate point during the departure time interval then the shipped item is assumed to be on schedule to be delivered to the destination on its expected date of delivery. The items are then shipped from the shipper to the recipient and the actual time and date that each shipped item arrives and departs from an intermediate point is recorded. The actual time and date that each shipped item arrives and departs from an intermediate point is then compared to the arrival time intervals and the departure time intervals for that corresponding intermediate point. If the actual time and date that each shipped item arrives and departs from an intermediate point falls outside either the arrival time interval or the departure time interval for that corresponding intermediate point for that shipped item, then an alert is provided.

Another aspect of the invention is a method of providing visibility of one or more shipped items. The method is comprises of the steps of establishing at least one route for each shipped item from a shipper to a destination, wherein the route is comprised of one or more intermediate points. The next step is determining an expected arrival time interval for recording the arrival of each shipped item for each intermediate point. Then, shipping each shipped item from the shipper to the recipient and recording the actual time and date that each shipped item arrives at the intermediate points. The actual time and date that each shipped item arrives at the one or more intermediate points is then compared to the arrival time intervals for each of corresponding intermediate point. In the next step, an alert is provided for each shipped item having an actual time and date that each shipped item arrives at said one or more intermediate points that falls outside the arrival time interval for each corresponding said one or more intermediate points.

Yet another aspect of the invention is a method of providing visibility of one or more shipped items. This method is comprised of the steps of first establishing a route for each shipped item from a shipper to a destination, wherein the route includes one or more intermediate points. The next step involves determining an expected departure time interval for recording the departure of each shipped item from each said one or more intermediate points. Next, the items are shipped from the shipper to the recipient and the actual time and date that each shipped item departs at the one or more intermediate points is recorded. The actual time and date that each shipped item departs at the one or more intermediate points is then compared to the departure time intervals for each of the corresponding one or more intermediate points. An alert is then provided for each shipped item having an actual time and date that each shipped item departs at the one or more intermediate points that falls outside the departure time interval for each of the corresponding one or more intermediate points.

Another aspect of the invention is a method of providing visibility of one or more shipped items. This method is comprised of the steps of first establishing at least one route for each shipped item from a shipper to a destination, wherein the route is comprised of one or more intermediate points. Then, and expected date of delivery at the destination is established for each shipped item if the shipped item is shipped via the route. An arrival time interval for recording the arrival of each shipped item for each intermediate point is also determined. The recording of the arrival at each intermediate point within the arrival time interval indicates that the one or more shipped items are on schedule to be delivered to the recipient on the expected date of delivery. Next, a departure time interval for recording the departure of each shipped item from each intermediate point is determined. Recording the departure at each intermediate point within the departure time interval indicates that the one or more shipped items are on schedule to be delivered to the recipient on the expected date of delivery. The one or more items are then shipped from the shipper to the recipient and the actual time and date that each shipped item arrives and departs from the one or more intermediate points is recorded. In the next step, the actual time and date that each shipped item arrives and departs from the one or more intermediate points is compared to the corresponding arrival time intervals and the departure time intervals for the corresponding one or more intermediate points. An alert is then provided for each shipped item having an actual time and date that each shipped item arrives and departs from the one or more intermediate points that has a variance from the corresponding arrival time interval or the departure time interval for the corresponding one or more intermediate points, if the variance affects the expected date of delivery.

Yet another aspect of the invention is a method of tracking one or more shipped items. The method is comprised of the steps of first establishing a set of expected occurrences for each item shipped. The one or more shipped items are then shipped and the shipment of said one or more shipped items is monitored for an occurrence of any one of the set of expected occurrences, a non-occurrence of any of the set of expected occurrences, and an occurrence of a first non-expected event. If the occurrence of the first non-expected event occurs for a particular shipped item, then a second set of expected occurrences is established for the particular shipped item and the shipment of the particular shipped item is monitored for an occurrence of the second set of expected occurrences, a non-occurrence of any of the second set of expected occurrences, and an occurrence of a second non-expected event. If the non-occurrence of any of the second set of expected occurrences or the occurrence of the second non-expected event occurs, it is reported.

Another aspect of the invention is a method of providing visibility of one or more shipped items. The steps of this method include establishing one or more routes for each shipped item from a shipper to a destination, wherein each route is comprised of one or more intermediate points. An expected date of delivery at the destination for each shipped item is then established. Arrival time intervals for each intermediate point are established for recording the arrival of each shipped item. Departure time intervals are determined for each intermediate point for recording the departure of each shipped item. If each shipped item arrives at one of said intermediate points during the shipped item's associated arrival time interval and departs the intermediate point during the departure time interval, then the shipped item is on schedule to be delivered to the destination on the expected date of delivery. Each shipped item is then shipped from the shipper to the recipient and the actual time and date that each shipped item arrives and departs from an intermediate point during shipment is recorded. If a shipped item arrives at a location not identified as one of the intermediate points, then one or more new routes for each shipped item are established from the present location to the destination, wherein each route is comprised of one or more new intermediate points. A new expected date of delivery at the destination is also established for each shipped item as well as new arrival and departure time intervals are established for each new intermediate point for recording these occurrences. If said each shipped item arrives at one of the new intermediate points during the shipped item's associated arrival time interval and departs said new intermediate point during the departure time interval, then the shipped item is on schedule to be delivered to the destination on the new expected date of delivery. The shipped item is then shipped from the location to the recipient and the actual time and date that each shipped item arrives and departs from each new intermediate point is recorded and compared to the arrival time intervals and the departure time intervals for that corresponding new intermediate point. An alert is provided for each shipped item having an actual time and date that each shipped item arrives and departs from each said new intermediate point that falls outside either the arrival time interval or the departure time interval for that corresponding new intermediate point.

If each shipped item arrives at the location that is identified as one of the intermediate points, then the actual time and date that each shipped item arrives and departs from an intermediate point is compared to the arrival time intervals and the departure time intervals for that corresponding intermediate point and an alert is provided for each shipped item having an actual time and date that falls outside either the arrival time interval or the departure time interval for that corresponding intermediate point.

Another aspect of the invention is a system for providing enhanced visibility of shipped items shipped via a carrier. The system is comprised of one or more event-based tracking systems for obtaining information about shipped items. The system is further comprised of a global tracking/data repository for receiving information from the event-based tracking systems and a visibility engine for providing at least a portion of the information to at least a shipper or a recipient of one or more shipped items over a network. A package routing module determines one or more routes for the transport of the shipped items from the shipper to the recipient via the carrier and an expected delivery date for each shipped item, wherein each route is comprised of one or more intermediate locations. A non-occurrence exceptions module, which monitors the one or more routes of each shipped item in transport by the carrier and assigns a status to each shipped item based on an event occurring at the one or more intermediate locations and communicates the status to the visibility engine to provide enhanced visibility of the shipped items.

The embodiments of the present invention provide a customer-convenient, efficient and cost-effective means of tracking the shipment of one or more parcels as they are processed through the mechanisms of a parcel delivery service. The above aspects of the present invention and other additional aspects are described more thoroughly below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1A:
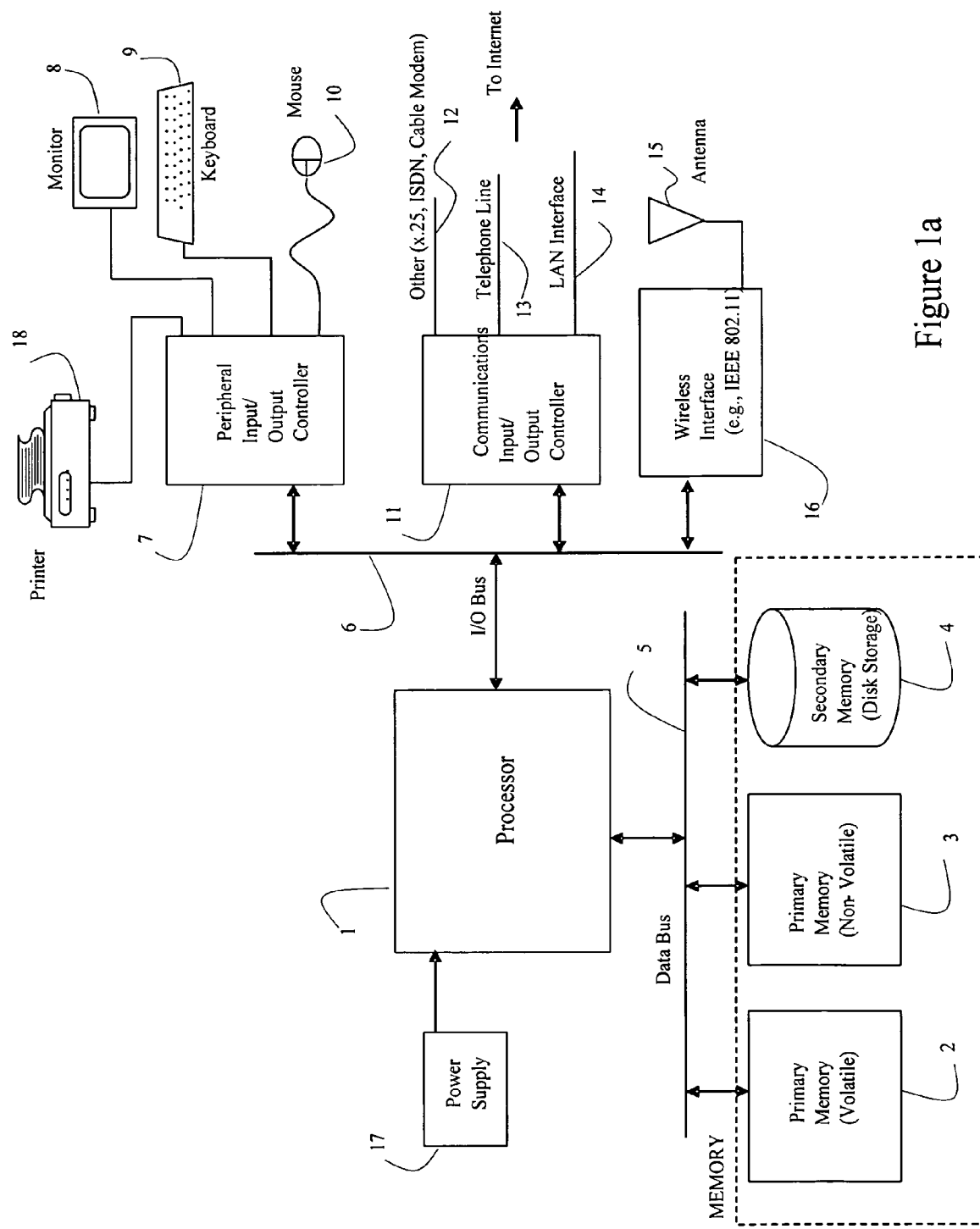
FIG. 1a is an illustration of one embodiment of a computer that can be used to practice aspects of the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The embodiments of the present invention are directed toward systems and methods to track items shipped via a package delivery service (a/k/a "carrier") such that enhanced visibility is provided for the tracking, reporting, and modification of delivery options. The parties to a shipping transaction include a shipper such as, for example, a vendor (e.g. Amazon.com, L.L. Bean, etc.); a carrier such as, for example, United Parcel Service of America, Inc. (UPS); and an intended recipient (a/k/a "customer"). In various embodiments of the invention, items (a/k/a packages) shipped via a carrier from a shipper to a customer are provided with visibility of not only where the package is or has been as determined by physical, keyed, derived, or logical scans and reads, but visibility is enhanced when the item does not arrive and is not scanned or read at a location where the package should have been received during the transit process or if the package arrives at a location not in a predicted transit route. Traditional tracking systems are generally described as event-based in that a package's location is recorded by scanning or reading information associated with the package such as machine-readable indicia like barcodes and machine-readable devices like RFID transponders. The embodiments of this present invention work cooperatively with event-based tracking and rely upon the consistency and predictability that a package takes from shipper to customer via the carrier to provide additional visibility when a shipped package is not received, scanned or read at a location where it should be found during the shipping transit process (i.e., non-occurrence of an expected event package tracking). In many instances, the embodiments of this invention are able to make use of existing event-based tracking/visibility systems to provide the non-occurrence based tracking. The embodiments of this present invention further allow visibility of items that are not received, scanned, or read at a certain location within a predicted time-frame. Such enhanced visibility allows the shipper, the carrier, the customer, and authorized third parties to be made aware of the status of a shipped item and to make adjustments to compensate for potentially delayed, delayed, and missing shipments.

In several of the embodiments referenced herein, a "computer" is referenced. The computer may be, for example, a mainframe, desktop, notebook or laptop, hand-held, etc. In some instances the computer may be a "dumb" terminal used to access data or processors over a network. Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provide power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
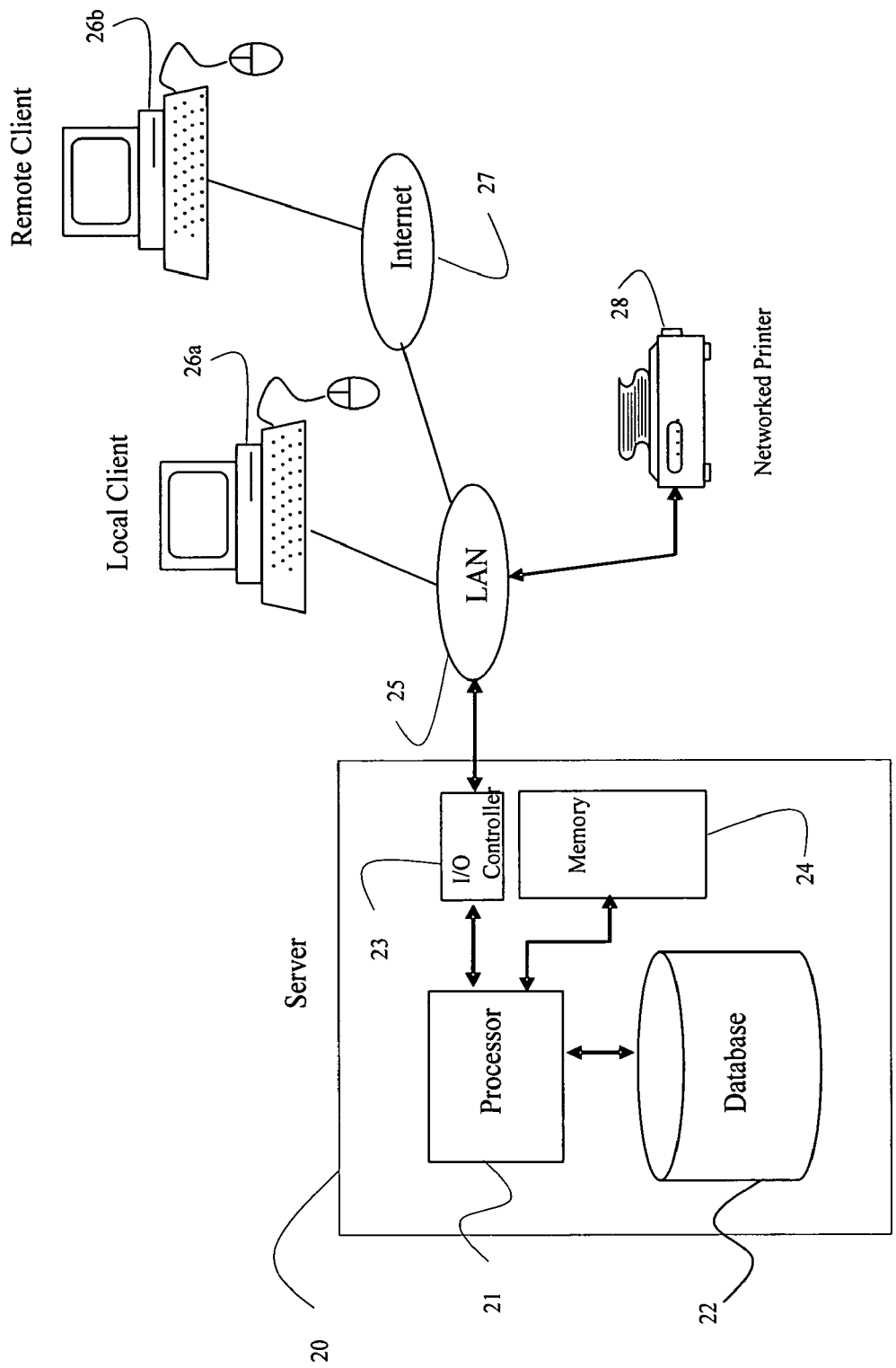
FIG. 1b is an embodiment of a processing system having a distributed communication and processing architecture that may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the principles of the present invention. The embodiments illustrated in FIGS. 1a and 1b can be modified in different ways and be within the scope of the present invention as claimed.

The consistency and predictability of an event-based tracking network allows for enhanced visibility. The embodiments of the present invention include non-event driven visibility when an expected scan or read event doesn't occur, and when a scan/read occurs for a package outside of the locations identified for routing the package from the shipper to the recipient. Furthermore, packages shipped by a carrier are generally assigned a scheduled delivery date (SDD) when received by the carrier. The enhanced visibility provided by the embodiments of the invention allow the recalculation and visibility of a rescheduled delivery date (RDD) when appropriate, and facilitates the validation of time in transit based on service level of a package and the origin and destination zip codes. Furthermore, the recipient, shipper or others with access to information about the package may determine the status of the package (e.g., "green," "yellow," or "red") caused by a rescheduled delivery date or a non-valid time in transit from the enhanced visibility of the embodiments of the invention.

In other embodiments, carriers generally assign codes to packages as they traverse the route from shipper to recipient. Some of these codes are based on "exceptions" encountered during the delivery process that may be caused by the package and its associated information, the shipper, the carrier and the recipient. Some of these codes may be associated with a change or delay in the delivery of the package to the recipient. In one embodiment of the invention, packages that are assigned certain codes identified by the carrier are provided with an enhanced visibility status so that it may be determined if there potentially will be, or is, a delay or other change in the delivery status of the package.

Several independent data sources that may already be employed by a carrier could be combined to provide enhanced visibility of package transit issues. These data sources include: package level detail information that is uploaded from shippers to the carrier or that is captured by the carrier; information from a new customer database that use the carrier to ship packages, event-driven package tracking/visibility systems; a carrier's published time in transit (TNT) for the offered classes of service, which includes TNT from one zip code to another zip code and from one carrier facility to another carrier facility; information about the carrier's network flow of packages including information about flows by carrier product (e.g., ground or air), flows between carrier facility pairs, and flow paths; origin equivalency table (OET) information for customized operating plans that may bypass carrier operating facilities, which provides the correct origin for packages that may be drop-shipped from an actual origin location (for example Milwaukee, Wis.) to a carrier facility at another location (for example, Chicago, Ill.); the time that a sorting process starts in a carrier's facility and the amount of time it takes to complete that sort; information regarding the location within a carrier's facility of a sort operation that services one or more classes of packages (e.g., ground, next-day air, two-day air, etc.); and publicly available reference data such as time zones, country codes, etc.

Furthermore, the embodiments of the invention are designed to accommodate the business processes of a carrier. For instance, carriers sometimes re-route packages through hubs and other carrier facilities that are not included in the original planned route for the packages. For example, packages shipped via ground service from Portland, Oreg. to Richmond, Va. may make an intermediate stop at a carrier's hub in Kansas. Generally, based on the usual package flows for the carrier, the packages destined for Virginia would leave the Kansas hub and be transported to Chicago. However, if all the trailers leaving the Kansas hub were full, some (or all) of the Virginia packages may be routed to a Texas hub where they are then routed to Virginia. While the initial re-route may cause a change of the status of the packages that were routed to Texas because Texas was not in the original routing plan and also because the packages failed to be seen or read in Chicago and thus the enhanced visibility may indicate the possibility of a delivery delay, the routing plan of the re-routed packages may be dynamically updated and a rescheduled delivery date determined. If the delivery of the packages to the Virginia destination will not be delayed (i.e., the re-scheduled delivery date is the same as the scheduled delivery date), the status of the re-routed packages will return to normal and the enhanced visibility will indicate the packages are on schedule for a normal delivery.

Figure 2:
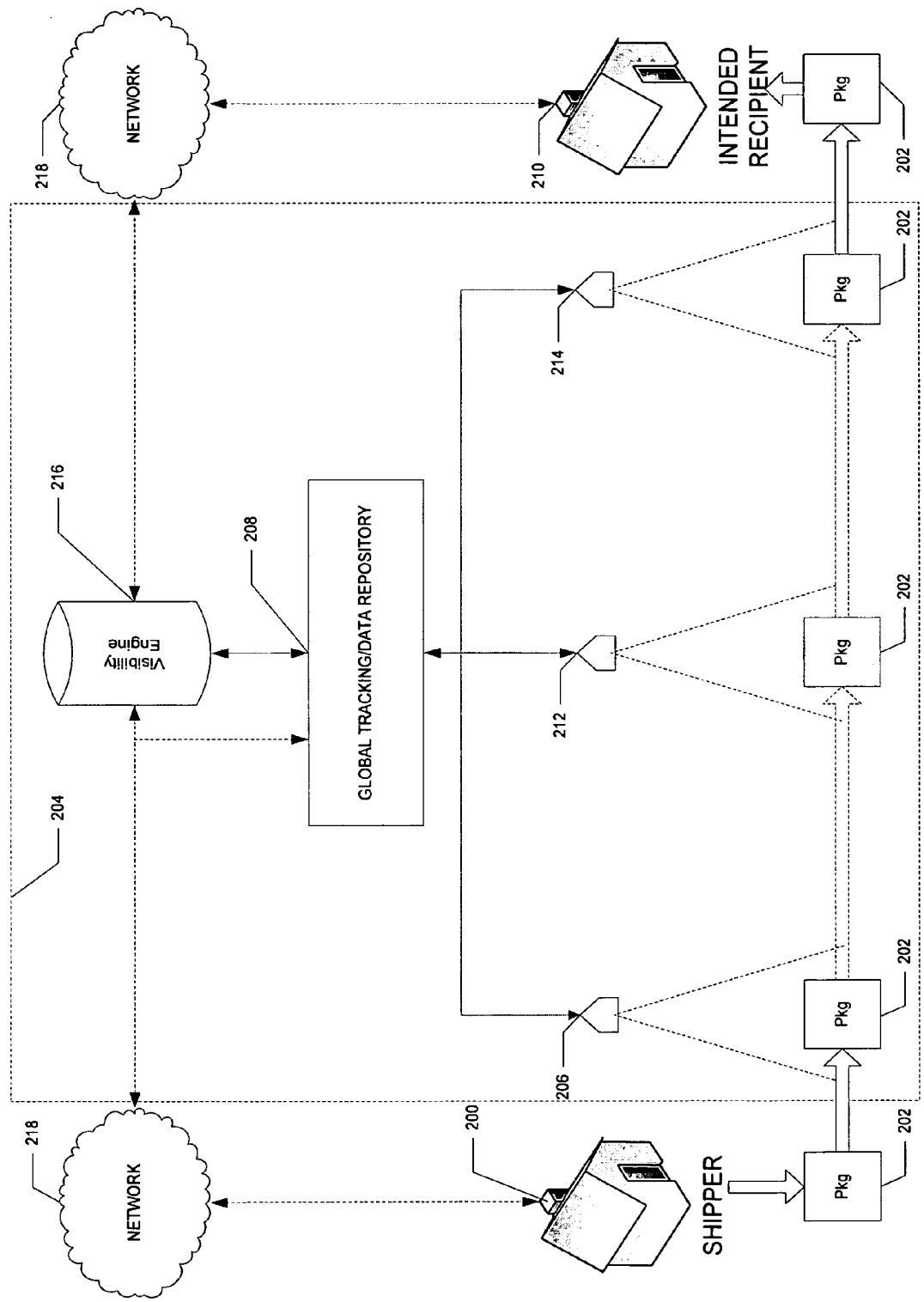
FIG. 2 is an overview diagram of an exemplary package tracking system as provided by carriers that may be used to practice one embodiment of the invention.

FIG. 2 is an overview diagram of an exemplary package tracking function as provided by carriers that may be used to practice one or more embodiments of the present invention. In FIG. 2, a shipper 200 ships a package 202 via a carrier 204. Upon taking possession of the package 202, the carrier 204 receives origin information about the package 202 via an origin processing system 206. The origin processing system 206 may involve the scanning or reading of shipping information from the package 202 (as shown in FIG. 2), or, in other embodiments, it may involve the transfer of information from the shipper 200 to the carrier 204 via means such as the transfer of data from a shipping client to the shipper over a network 218 such as, for example, the Internet. The origin information is stored in a global tracking/data repository 208 that may be comprised of one or more hardware components such as computers, servers, processors, and databases, and computer software applications that may be centrally located or distributed across an enterprise. The global tracking/data repository may be accessed, utilized and maintained by a multitude of business areas and applications. Origin information may include but is not limited to a package tracking identifier, the name and address of the shipper, the name and address of an intended recipient 210, the time, date and location the package 202 was received by the carrier 204, identification of the carrier representative receiving the package 202, the size and weight of the package 202, the class of service (e.g., ground, overnight air, etc.) to be used by the carrier 204 in delivering the package 202, COD information (if applicable), special handling instructions, etc. Some or all of the origin information may be encoded on the package as machine-readable indicia (e.g., barcodes) or contained in machine-readable devices such as RFID transponders that are affixed to the package 202, where such information is obtained by scanning or reading the machine-readable indicia or device.

As the package 202 is transported from the shipper 200 to the recipient 210 via the carrier 204, the package may undergo one or more intermediate event-based tracking actions such as scans or reads by one or more intermediate tracking systems 212 occurring when the package 202 enters and/or exits carrier facilities such as sorting and transportation hubs or at other discrete locations along the delivery route. This intermediate tracking information may include the package tracking identifier, the time, date and location that the package was received or exited the intermediate carrier facility, one or more identifiers that are associated with the vehicle or means of transport that brought the package 202 to the intermediate facility and that are used to further transport the package 202 during the delivery process, etc. The intermediate tracking information, either in part or in total, is provided to the global tracking/data repository 208 from the intermediate tracking systems 212 where it may be stored.

In many instances, the package 202 receives one last scan or read before delivery to the recipient 210. In some instances, the recipient 210 may be requested to provide proof of receipt of the package 202, such as a signature. This information is generally captured by one or more destination tracking systems 214 such as, for example, a Delivery Information Acquisition Device/DIAD Control System ("DIAD/DCS) system as employed by UPS. As described above, information captured at the time of delivery is, at least in part, stored in the global tracking/data repository 208.

Carriers 204 generally make tracking information available to shippers, recipients, and others through a visibility engine. Such an engine typically operates by receiving a request for tracking information accompanied by package identifying information such as, for example, a package tracking number from an interested party via a network 218 such as, for example, the Internet, a public switched telephone network, etc. Information associated with the provided package identifying information is extracted from the global tracking/data repository 208 and made available to the requesting party, generally visually or audibly, by the visibility engine 216. Several embodiments of a visibility engine are disclosed in U.S. patent application Ser. No. 10/265,079, "Inbound and Outbound Shipment Notification Methods and Systems" by Franz et al. and published on May 22, 2003 as Publication Number US 2003/0097287 A1, previously fully incorporated herein and made a part hereof.

Figure 3:
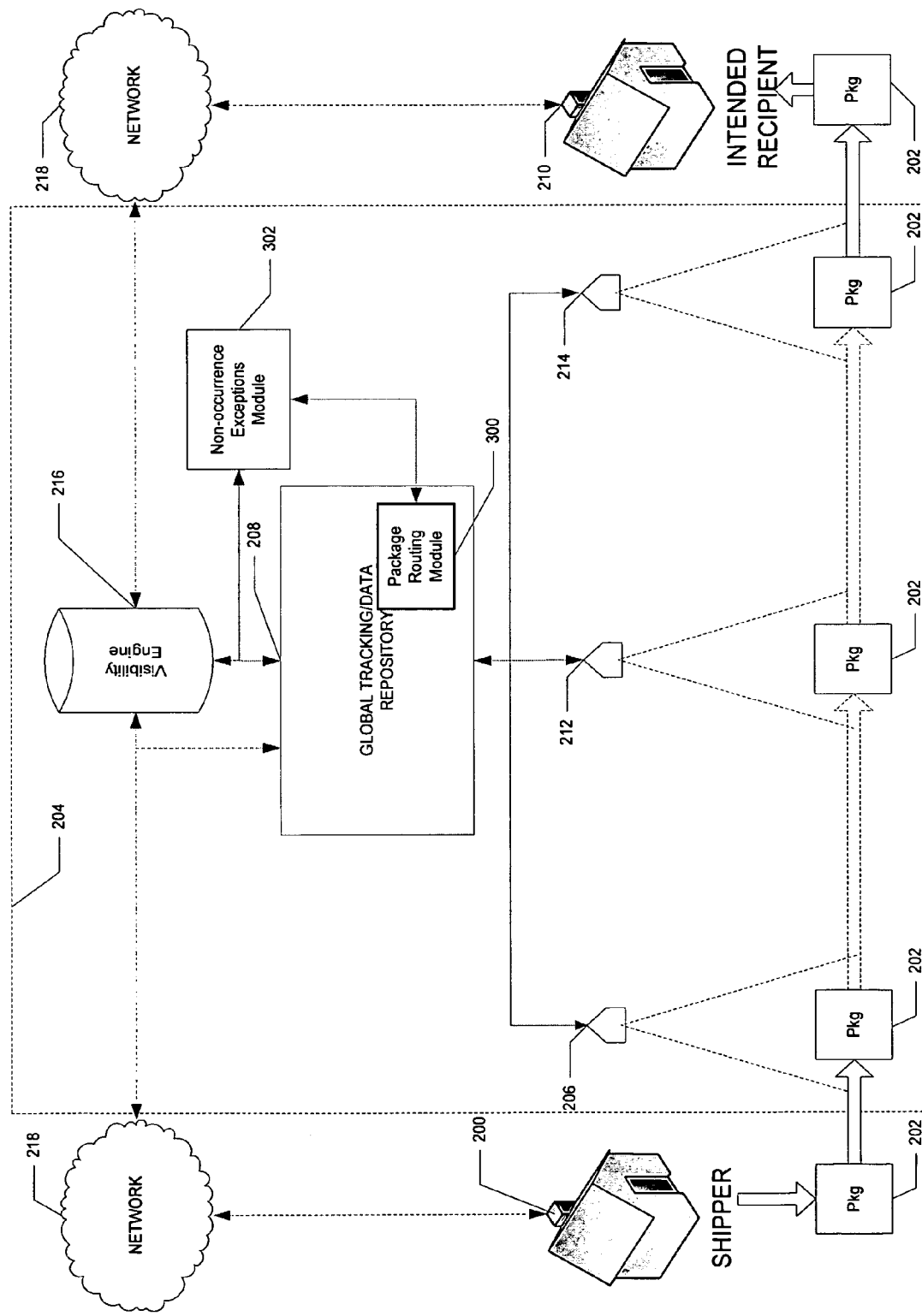
FIG. 3 is an overview of an exemplary package tracking system including a package routing module in an embodiment of the invention.

In a general embodiment of the present invention, the exemplary package tracking function as shown in FIG. 2 and described above is incorporated into a non-event driven tracking function that provides enhanced tracking visibility for shippers, carriers, recipients and interested third parties. As shown in FIG. 3, a package routing module 300 is included in the system of FIG. 2, such that when the origin information obtained when the package 202 comes within the possession of the carrier 204 or when the origin information is received from the shipper 200, one or more routes are determined for the transport of the package from the shipper 200 to the recipient 210 via the carrier 204. Each route includes the anticipated or expected carrier locations (e.g., facilities, hubs, etc.) where the package 202 will pass and be scanned or read during its transport and an expected time in transit between each location. The package routing module 300 also associates a time window with each anticipated or expected scan or read. The time window is determined by the expected time in transit from the previous location.

In the embodiment of FIG. 3, a non-occurrence exceptions module 302 is also incorporated into the system of FIG. 2. If, during the transport of the package 202 from the shipper 200 to the recipient 210 via the carrier 204, the package 202 is received and scanned or read at an expected location as determined by the package routing module 300 within the anticipated time window, then the package 202 is considered to be on-time and in normal transit (e.g., "green light"). If the package 202 is received at such a location outside the anticipated time window, generally after the time window has expired, then an alert flag is triggered (e.g., "yellow light" or "red light"). If the package 202 is never received at an expected location, then a high level of alert is triggered (e.g., "red light"), which may result in follow-up actions such as a search or a trace placed on the package 202. The non-occurrence exceptions module 302 monitors the anticipated routes of each package 202 in transport by the carrier 204 and assigns a status (e.g., "red light," "yellow light," "green light," etc.) to each package 202 if the package fails to be scanned or read at an expected location within a predetermined time window. The non-occurrence exceptions module 302 communicates with the visibility engine 216 in the embodiment of FIG. 3. In this manner, a shipper 200, recipient 210, carrier 204, or interested third party may quickly determine the shipments status of the package because the inquirer is provided not only information corresponding to event-based scans and reads that indicate the location of the package 202, but also with non-event based visibility that indicates whether the package 202 is on at least one of its predetermined routes and whether it is meeting its predetermined time windows for an on-time delivery.

Figure 4A:
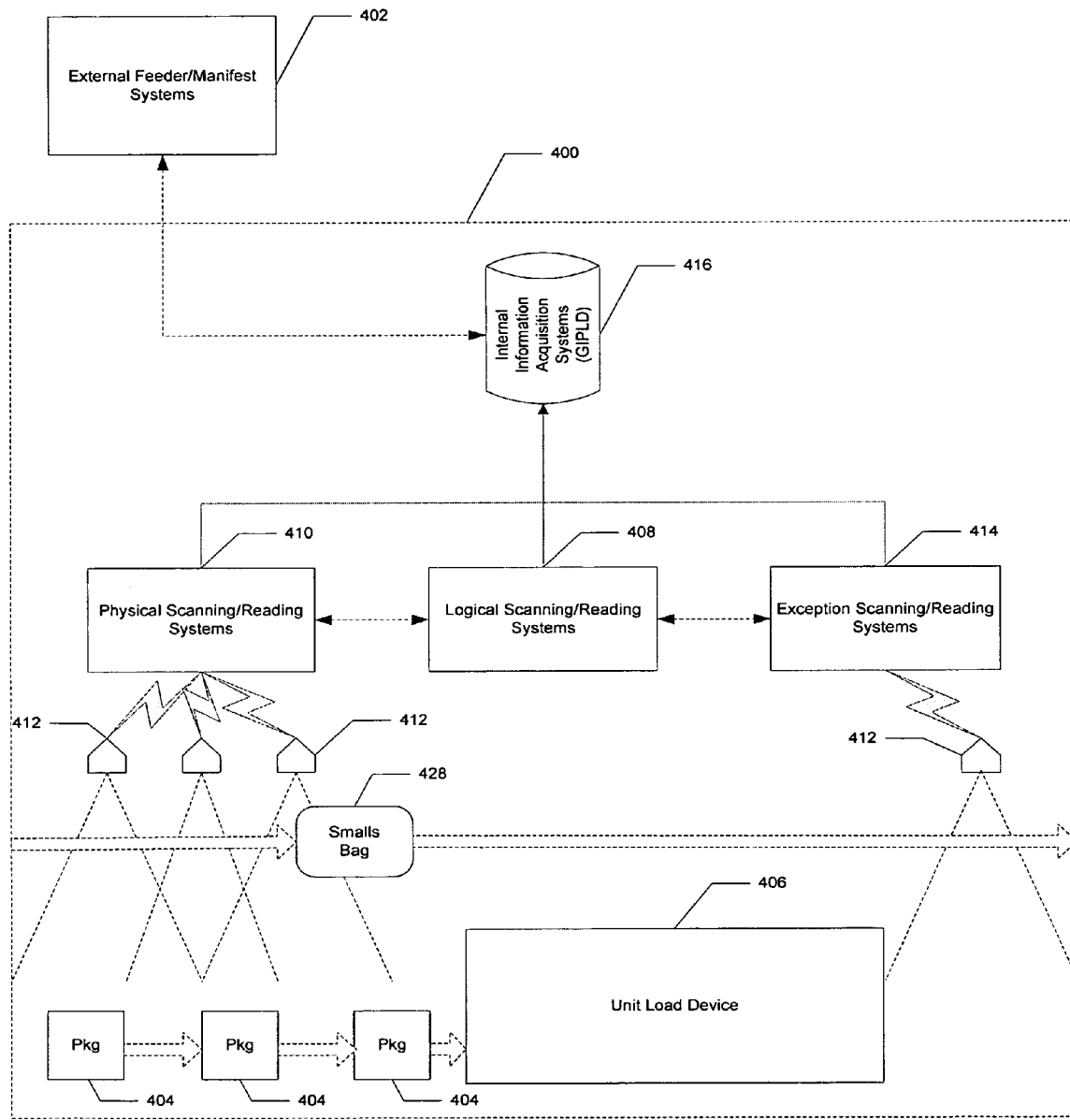
FIG. 4A is a diagram that illustrates how a carrier processes items within a carrier-controlled facility as such items are transported from shipper to recipient.

FIG. 4A is a diagram that illustrates how a carrier processes items within a carrier-controlled facility as such items are transported from shipper to recipient. FIG. 4A also shows an interface with external systems such as external feeder/manifest systems 402 via a network such as, for example, the Internet or other networks capable of transmitting information. Such a carrier-controlled facility may be where parcels or packages are introduced to the carrier system or may be an intermediate point encountered by parcels during their delivery route. In FIG. 4A, the internal (within the carrier's control) processes are shown within the dotted line. Items 404 are received into and transported away from a carrier facility 400 by tractor-trailers or other transportation vehicles (including trucks, planes, trains, automobiles, etc.) or are received by the carrier from customers. Each item 404 that is received and that departs from the facility 400 is scanned or read by physically scanning the item 404 or a unit load device 406 that contains one or more item 404 and a date/time stamp of when they depart and arrive from the carrier's operations is recorded for each item. Package tracking numbers are scanned or read (physically) and linked to unit load devices 406 such as smalls bags (that contain one or more "small" items such as envelopes and small packages destined for the same carrier location), a trailer, a container within an aircraft, an airplane etc. The described linking facilitates efficiently tracking items in that when a unit load device 406 is (physically) scanned or read at a given location, all of the package tracking numbers of items contained within, or associated with, that unit load device are also scanned or read logically. An embodiment of a unit load device 406 comprised of a "smalls bag" 420 that contains small packages, flats or envelopes is physically scanned 410 and even though a physical scan of the items contained within the smalls bag 420 does not occur, logical scans 408 are created when the bypassed smalls bag 420 is scanned within the facility 400.

In the embodiment illustrated in FIG. 4A, one or more logical scanning/reading systems 408, such as, for example, a hub forecast control system and/or a trailer control forecast system, work in conjunction to create logical scans or reads for the movement of trailers departing and arriving from other carrier operations. A physical scan of an indicia or device such as, for example, a barcode or RFID tag, associated with a trailer results in a logical scan of all items contained within the trailer and having unique tracking identifiers as such tracking identifiers were previously linked to the trailer indicia. A physical scanning control system 410 is a system within each facility 400 that records the physical scans applied to a package 404 or unit load device 406 by the carrier, and which also associates each scanned or read package tracking number with its given unit load device 406 (if there is one). In FIG. 4A, a radio frequency scanner device 412 may be used to scan the packages 404 and unit load devices 406 in one embodiment of the invention, though it is contemplated that in other embodiments other scanners or readers such as optical scanners and/or RFID readers may be used.

Figure 4B:
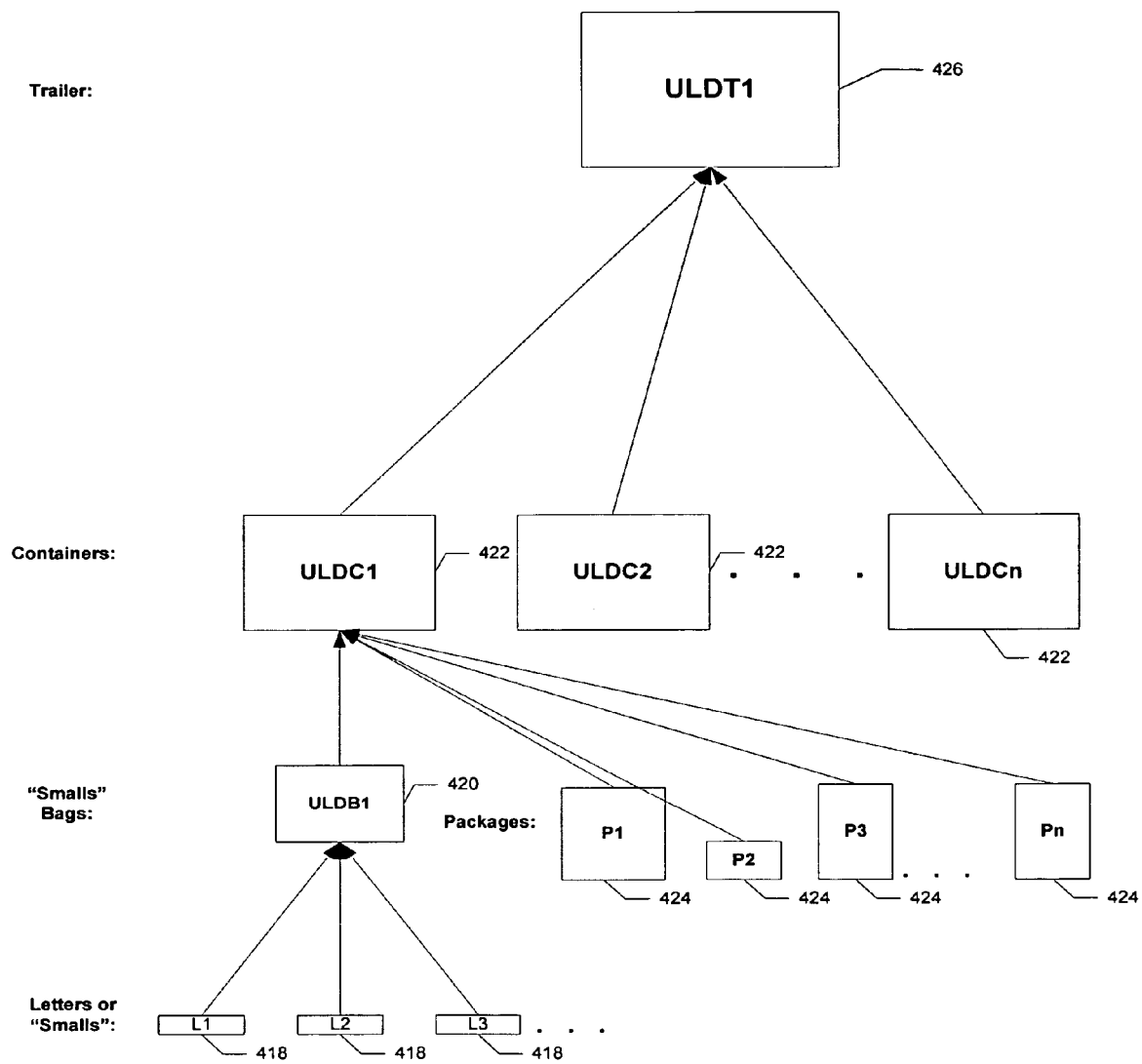
FIG. 4B is a diagram that illustrates the hierarchical relationship that may be created by the linking of each item's unique tracking identifier to a ULD identifier, which may, in turn, be hierarchically linked to another ULD identifier, in an embodiment of the invention.

FIG. 4B illustrates the hierarchical relationship that may be created by the linking of each item's unique tracking identifier to a unit load device identifier, which may, in turn, be hierarchically linked to another unit load device identifier. For instance, in FIG. 4B, several letter or "smalls" 418 each having a unique tracking identifier (e.g., L1, L2, L3 . . . ) are linked to a unique unit load device (ULD) identifier (e.g., ULDB1), which in this example is a smalls bag 420, as previously described. The ULD identifier of the smalls bag 420 is linked to a unique ULD device identifier (e.g., ULDC1) that is associated with a container 422 in which the smalls bag 420 is placed. Also linked to the container's ULD device identifier are several unique tracking identifiers (e.g., P1, P2, P3, . . . ) of individual packages 424 that are also placed in the container 422. Several containers 422 each having unique ULD identifiers (e.g., ULDC1, ULDC2, . . . , ULDCn) may be placed inside a trailer 426 and the unique ULD identifier of each container associated with a unique ULD identifier (e.g., ULDT1) of the trailer 426. All of the above-described linking information can be stored in electronic computer databases, as are known in the art. In this way, a single physical scan or read of a machine-readable indicia or device such as a barcode or an RFID tag that is encoded with the ULD identifier of the trailer 426 and is associated with the trailer 426 can result in a logical scan of all the ULDs and/or package tracking identifiers that are linked to that trailer 426 and all the package, letter, etc. tracking identifiers that are associated with the ULDs. Likewise, the physical scan of any ULD identifier (e.g. associated with a trailer, container, smalls bag, etc.) results in a logical scan of any items having ULDs and/or package tracking identifiers contained within the scanned ULD.

Referring back to FIG. 4A, an exception scanning/reading system 414, as shown in FIG. 4A, is another database system within the carrier's operations that is capable of batch injecting scans on a group of packages rather than scanning each single package. For example, if a carrier's facility 400 is forcibly closed because of a natural disaster such as a hurricane, the carrier's personnel would use the exception scanning/reading system 414 to perform an exception scan to all unit load devices 406 associated with that facility. By physically scanning or reading the unit load devices 406, logical scans would subsequently be applied to all of the packages associated or linked with those unit load devices 406. Therefore, the exception scanning/reading system 414 is capable of performing physical and logical scans. The system of FIG. 4A is also comprised of a global repository 416 where all packages' 404 scan or read information is stored and made accessible to that carrier and at least in part to shippers, recipients or designated third parties. The global system 416 is also capable of directly receiving package information from external feeder/manifest systems 402 such as, for example, on-line shipping systems.

Figure 5:
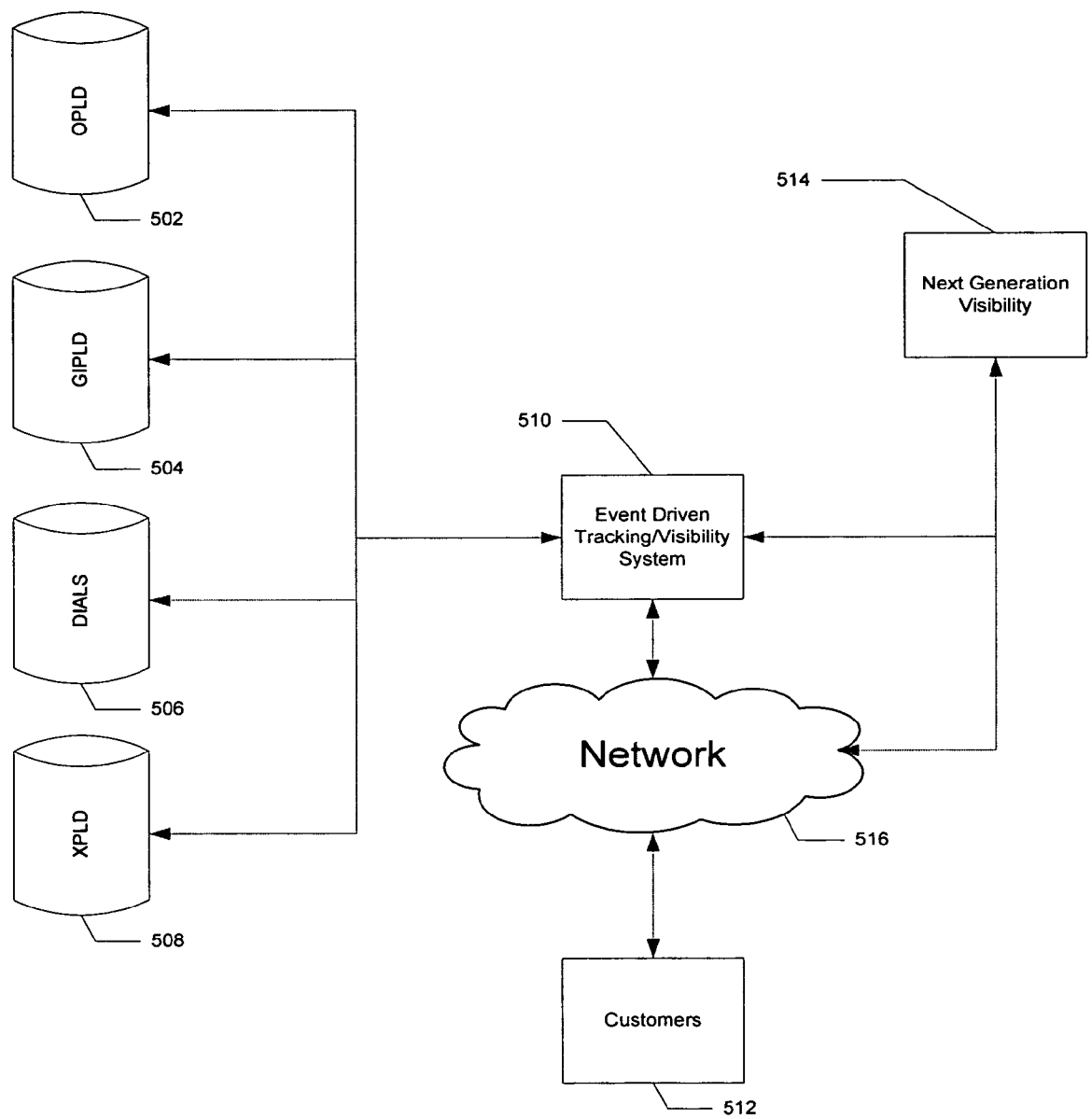
FIG. 5 is a diagram that illustrates the interaction between an event-driven tracking and monitoring systems of a carrier, customers and an embodiment of the present invention.

FIG. 5 is a diagram that illustrates an embodiment of a system for the interaction between event-driven tracking and monitoring systems of a carrier, customers, and an embodiment of the present invention. In FIG. 5, package level detail databases such as, for example, an origin package level detail database (OPLD) 502 that contains shipment data received from a carrier's customers resides in a repository; a global internal package level detail (GIPLD) database 504 containing internal scan or read information, and more fully described in reference to FIGS. 4A and 4B, above, resides in a repository; a delivery information automated lookup system (DIALS) 506, which contains information recorded by the carrier's driver's during delivery and/or pick-up of items resides in a repository; and exception package level detail (XPLD) 508, which contains information about exception scans or reads resides in a data repository. Data from one or more of the above-referenced repositories 502, 504, 506, 508 flows into and through an event-driven tracking/visibility system 510, such as the QuantumView™ system used by UPS, and as such systems are otherwise known in the art, to provide timely package information including scan and delivery activities to the carrier's customers 512 in an unsolicited fashion and in response to queries from said customers 512. This data, in one embodiment, is sent via EDI (Electronic Data Interchange) or over a network from the event-driven tracking/visibility system 510 to the next generation visibility (NGV) system 514 of the embodiments of this invention so that a package can be monitored and evaluated during its delivery cycle. Customers 512 may access the event driven tracking/visibility system 510 over a network 516 such as, for example, the Internet and at a website such as, for example, www.ups.com, where the customers 512 are provided addition visibility in regards to their packages and shipments by the next generation visibility system 514. Customers 512 may also directly access the next generation visibility system 514 over the network 516. The enhanced visibility provided by the next generation visibility system 514 includes a status that indicates whether the package of interest is currently scheduled for delivery on the date first designated (its delivery date), potentially could be delayed, or is delayed (along with a new delivery date).

Figure 6A:
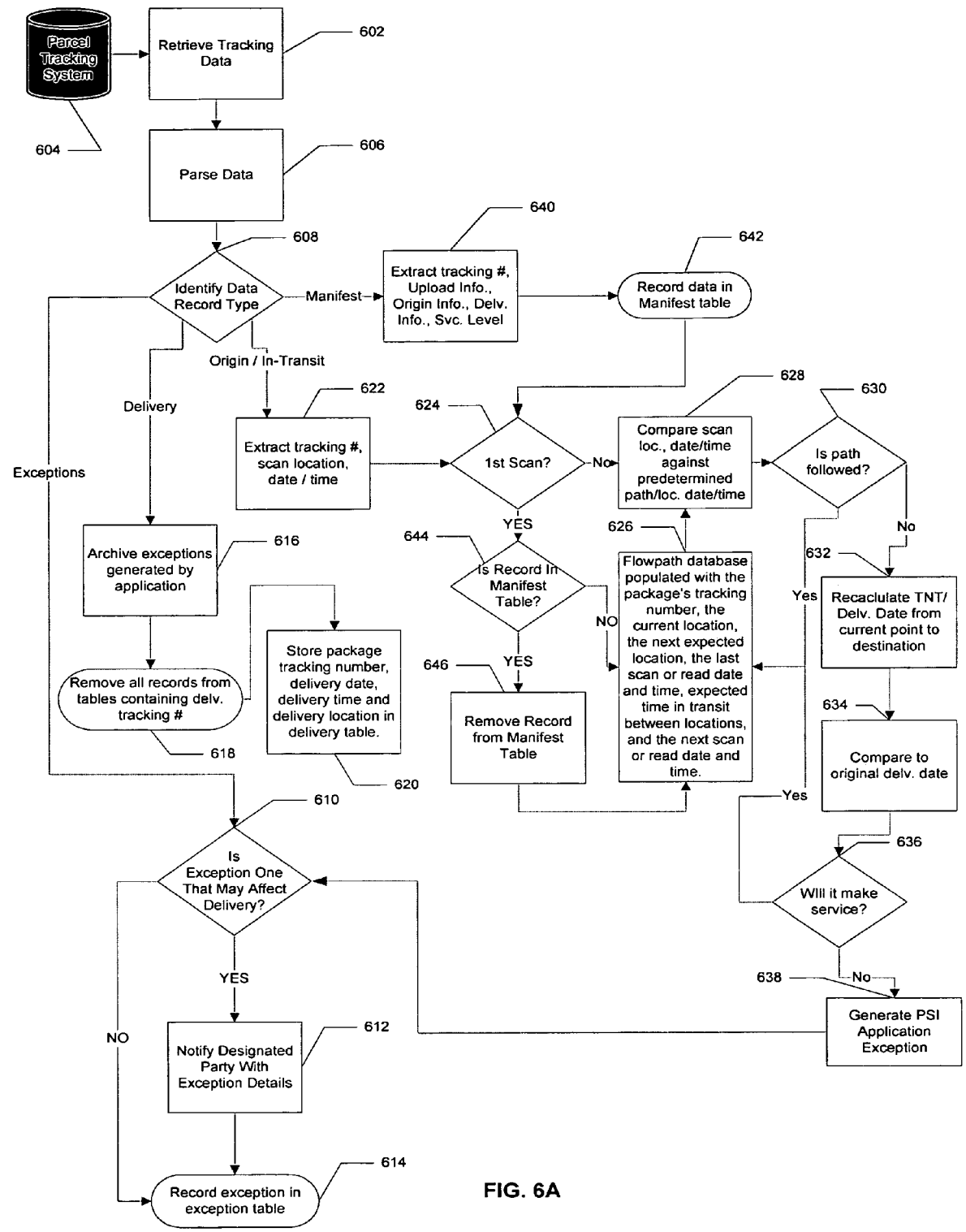
FIG. 6A is a diagram illustrating information and data flows in a process of an embodiment of the invention.

FIG. 6A is a more-detailed diagram of information and data flows in a process of an embodiment of the invention. In FIG. 6A, at Step 602 package tracking data is retrieved from a parcel tracking system 604 as are known in the art. In one embodiment, the tracking system 604 is an event-driven parcel tracking/visibility system that tracks packages based on the occurrence of an event such as a scan or read as a package is received by a carrier, transported through the carrier's internal routing, and delivered to a recipient. At Step 606, the information received from the tracking system 604 is parsed so that the identity of each received record may be determined. Generally, in the embodiment of FIG. 6A, each record received from the tracking system may be one of four types, manifest information from the OPLD, exception information from the XPLD, delivery information from the DIALS, or origin/in-transit information from the GIPLD, as these data repositories are described more fully herein, or equivalents thereof.

Figure 6B:
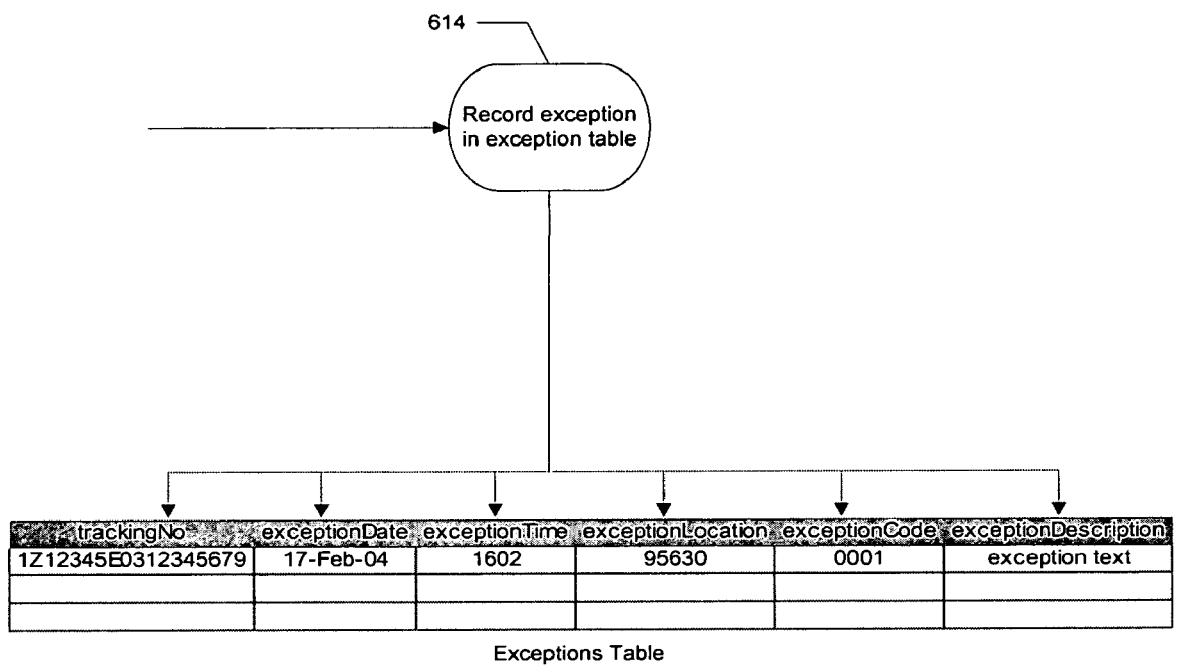
FIG. 6B is an exemplary exceptions table having exception information as utilized in the embodiment of the invention shown in FIG. 6A.

If, at Step 608, it is determined that the parsed information is an exception record, then at Step 610 if the exception is of a designated variety that may affect the date of delivery or other delivery parameters, then at Step 612, the shipper or the recipient or another designated party is notified of the exception. This notification may be in the form of an email, phone call, posting on a website, etc. The notification, in one embodiment, is dependent upon the nature of the exception, as such nature may be identified by an exception code. In Step 614 an exceptions table is populated that links the package tracking number with an exception code. If, at Step 610 it is determined that the exception is not one that would affect delivery, then the process goes from Step 610 to Step 614 and the package tracking number along with the exceptions code is recorded in the exceptions table. This exceptions table may be accessible by the package tracking system thus increasing the visibility of the package and providing additional information to the carrier's customers. An exemplary exceptions table having exception information is illustrated in FIG. 6B.

Figure 6C:
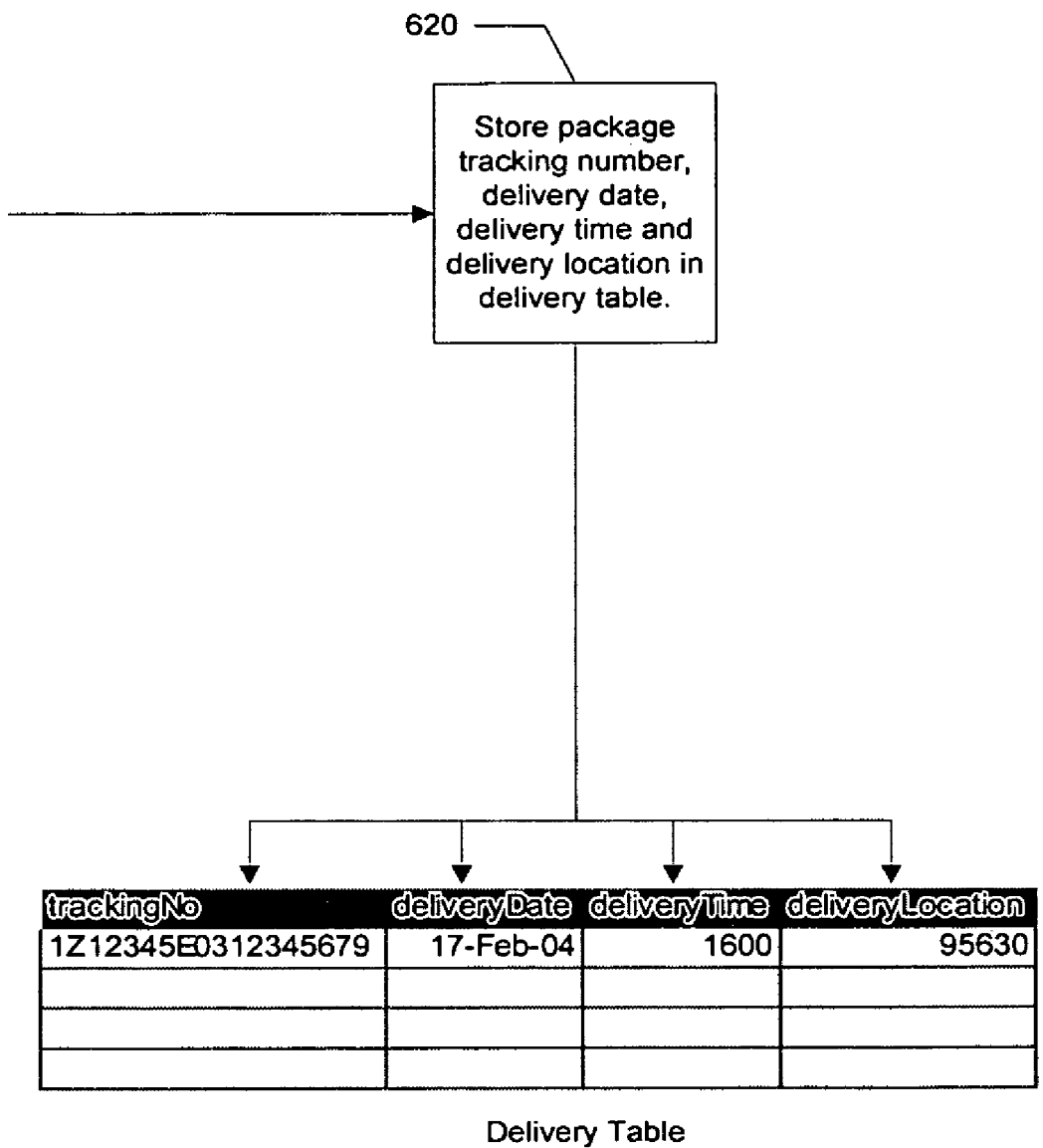
FIG. 6C is an exemplary delivery table having package delivery information, which is utilized in the embodiment of the invention shown in FIG. 6A.

Referring now back to FIG. 6A, if at Step 608, the parsed record is identified as a delivery record, then this is an indication that the package has been delivered to its final destination. In the embodiment of FIG. 6A, at Step 616 any exceptions associated with a delivered package (as determined by the package tracking number) are removed from the exceptions table identified in Step 614 and are archived. Furthermore, at Step 618, any records found in other tables identified in this embodiment of the invention are removed from the tables by use of the package tracking number. At Step 620, the package tracking number, delivery date, delivery time and delivery location are extracted from the record and stored in a delivery table, one embodiment of which is shown in FIG. 6C.

Referring back again to FIG. 6A, if at Step 608, the parsed record is identified as an origin/in-transit record, then this indicates that the package is in-route to its final destination. In the embodiment of FIG. 6A, at Step 622 the package tracking number, delivery date, delivery time and delivery location are extracted from the record. The process then moves to Step 624 where it is determined whether the extracted information is associated with the first scan or read of an item after it is received by a carrier. If the scan or read is the first scan or read, then at Step 644 it is determined whether there is a corresponding package tracking number in a manifest table (explained more fully herein) and if there is, the manifest information is removed from the manifest table at Step 646 and the process goes on to Step 626 where the manifest table information is combined with the flowpath information and a flowpath database is populated with information about that package. The flowpath database includes records having the package's tracking number, the current location (current SLIC), the next expected location (next SLIC), the last scan or read date and time, expected time in transit between locations, and the next scan or read date and time. Removing the manifest information from the manifest table indicates that the package is in the process of being delivered by the carrier. If, at Step 644, there is no record of the package in the manifest table, then the process goes directly to Step 626 where the flowpath database is populated with information about that package. Returning back to Step 624, if the scan or read was not the first scan or read for the package, then at Step 628 the most recent scan or read is compared against the predetermined path, location date and time from the flowpath database. It is then determined at Step 630 whether the package is following the predetermined path on its route. If the package is on the predetermined path and within schedule, then the process returns to Step 626 where the flowpath database is queried to determine the next location, date and time for the next scan or read. The process then goes to Step 628 where the most recent scan or read is compared to the predetermined flowpath.

If at Step 630 it is determined that the predetermined flowpath is not being followed based on the current location of the package, then at Step 632 the time in transit (TNT) and delivery date from the current location of the package to the destination is recalculated. The recalculated time in transit and anticipated delivery date are compared to the original predetermined delivery date at Step 634. At Step 636, it is determined whether the package will still be delivered on the original predetermined delivery date. If not, then at Step 638 a delivery exception is generated and the process goes to Step 610, as previously described. If, at Step 636, it is determined that the package will still be delivered on its original delivery date, then the process returns to Step 626 to retrieve the next expected scan/read.

Figure 6D:
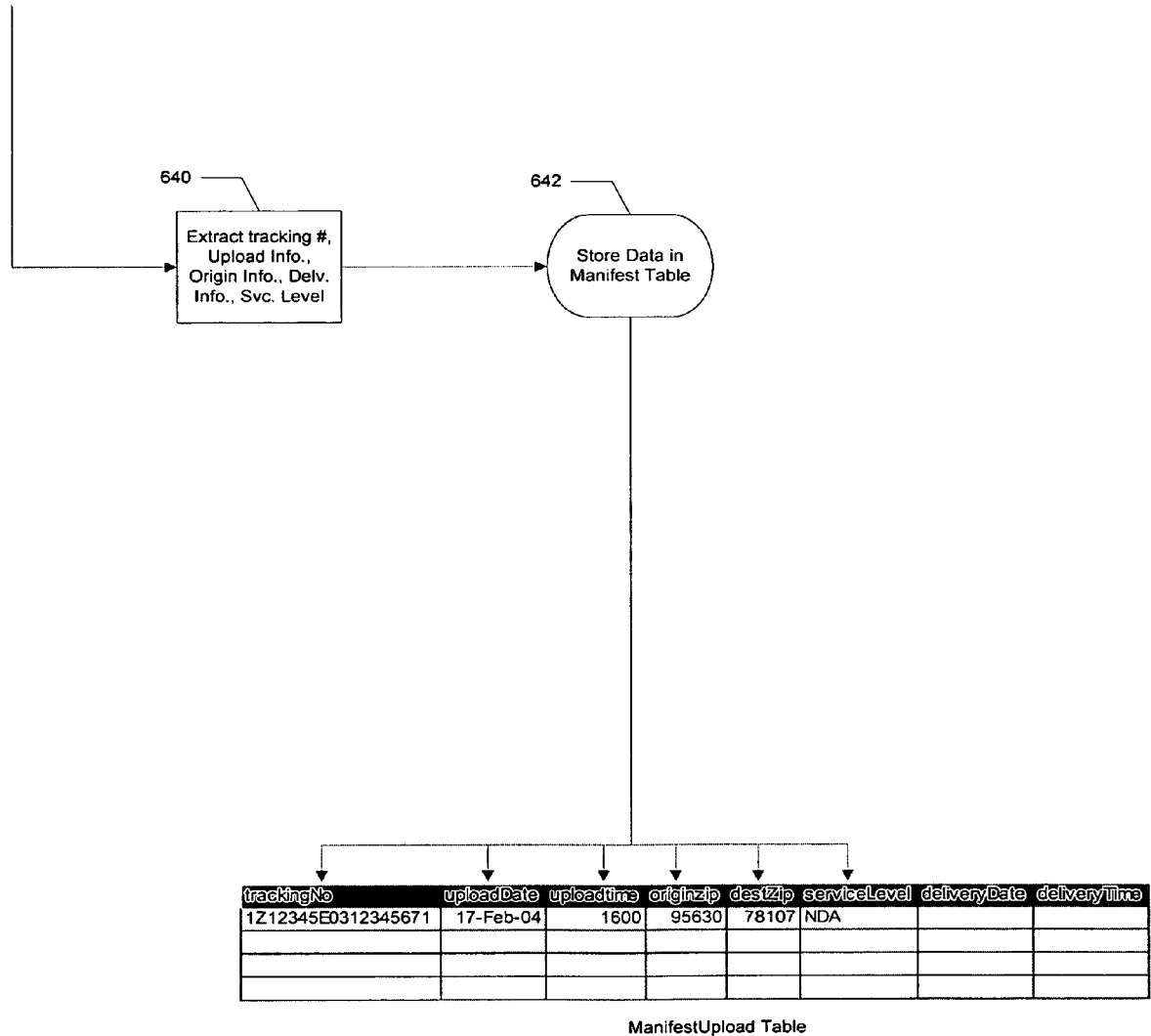
FIG. 6D is an exemplary manifest table having manifest information about items to be delivered by a carrier, which is utilized in the embodiment of the invention shown in FIG. 6A.

Referring back to FIG. 6A and Step 608, if it is determined that the data parsed from the tracking system is a manifest record, then at Step 640 the package tracking number, upload information, origination information, delivery information and service level are extracted from the record. At Step 642, this extracted information is used to create a manifest table similar to the table shown in FIG. 6D. The process then goes to Step 624 to await the first scan of a package having a package tracking number found in the manifest. When a scan of an item having a tracking number occurs then at Step 624 it is determined if that is a first scan. If it is a first scan, then at Step 644 it is determined whether there is a corresponding package tracking number in the manifest table and if there is the manifest information is removed from the manifest table at Step 646 and the process goes on to Step 626 where the manifest table information is combined with the flowpath information and placed in the flowpath database. The package will then be considered as being in-transit and will be tracked and reported using the described origin/in-transit processes described above.

Generally, tracking systems are based on scan events or reads that occur as an item makes its way from a shipper to an intended recipient through the package delivery system. While such scans or reads are generally described above as involving a device that optically, electrically, magnetically, or uses other means to interrogate or read an indicia or device associated with a package (i.e., "physical" scans), other such "events" may be obtained through keyed, derived and logical processes. Visibility for an item is created each time a package event happens through physical, key, derived, and logical scans. Tables I, II, III and IV, below, provide exemplary physical, keyed, derived and logical scans, respectfully, that may occur during the transit of a parcel from a shipper to an intended recipient in an exemplary event-based tracking system and which may be utilized by the embodiments of this invention.

TABLE I

Physical Scans/Reads

| Scan/Read Acronym | Type | Definition |
| --- | --- | --- |
| ORIG | Origin | Represent the carrier's first delivery service center that a package enters. |
| LOC | Location | Represents the following information about where the package was actually handled and re-scanned into another container or trailer at a delivery service facility: Time Date Location |
| HUB | Hub | Indicates the package is in transit. |
| DEST | Destination | Indicates the package has |

TABLE I-continued

Physical Scans/Reads

| Scan/Read Acronym | Type | Definition |
| --- | --- | --- |
| | | reached the center in the destination country. |
| WHRS | Warehouse | Indicates that package movement has halted and the package is warehoused for further action. |
| PKUP | Pick-up | Represents the time and date the package was picked up at the shipper's location. |
| DRVL | Driver Load | Indicates that the package was loaded and scanned into the delivery driver's vehicle, and is out for delivery. |

TABLE II

Keyed Scans/Reads

| Scan/Read Acronym | Type | Definition |
| --- | --- | --- |
| EXCP | Exception | Specific information about a specific shipment. |
| DELV | Delivery | Proof of delivery information regarding a specific shipment. |
| PKUP | Pick-up | Represents the time and date the package was pick-up at the shipper's location. |

TABLE III

Derived Scans/Reads

| Scan/Read Acronym | Type | Definition |
| --- | --- | --- |
| ORIG | Origin | Created from the associations specified an Origin Equivalency Table (OET). Represents the first carrier center the package entered. |

TABLE IV

Logical Scans/Reads

| Scan/Read Acronym | Type | Definition |
| --- | --- | --- |
| ARRV | Arrival | Indicate the package has arrived at a carrier's location. It displays the following information about where the package was scanned: City State Country Date Time |
| DPTD | Departure | Indicate that the package has departed a carrier's facility (center, origin, hub, etc.). It displays the following information: City State Country Date Time |
| UNLD | Unload | Displays the following information about where the |

TABLE IV-continued

Logical Scans/Reads

| Scan/Read Acronym | Type | Definition |
|---|---|---|
| | | package was unloaded at a carrier's facility: Time Date Location |
| EXPT | Export | International scan that indicate the package has left the origin country. |
| IMPT | Import | International scan that indicate the package has arrived in the destination country. |
| TRAN | In-Transit | Represents the location of the next scheduled sort location for the package. |

Figure 7:
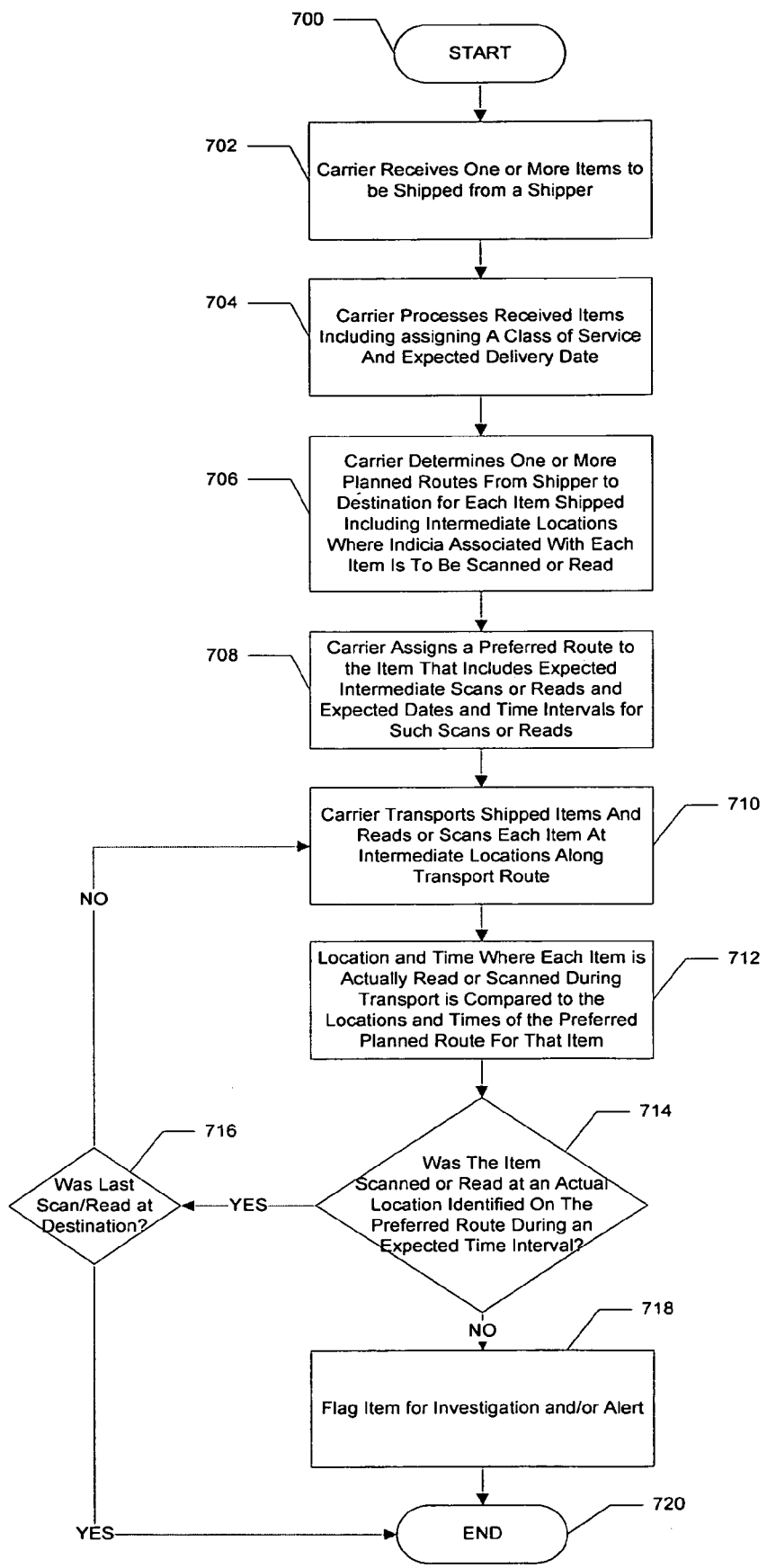
FIG. 7 is a flow chart that illustrates a method involved in one embodiment of the invention for providing enhanced visibility of items shipped via a carrier.

FIG. 7 is a flow chart that illustrates a method involved in one embodiment of the invention for providing enhanced visibility of items shipped via a carrier. The process begins at Step 700. At Step 702, a carrier receives one or more items (e.g., packages) from a shipper that are to be shipped to a destination. The items may have a shipping label pre-affixed that provides shipping information to the carrier, where such shipping information may include the shipper's name and address, the class of service, the weight of the item to be shipped, the recipient's name and address, etc. Also affixed to the item or incorporated into the shipping label is some form of machine-readable indicia or device such as a barcode or an RFID transponder that contains at least an encoded package tracking number. In other instances, the shipping label is attached to the item by the carrier once it is received from the shipper. At Step 704, the carrier processes the received items to be shipped by obtaining shipping information from the shipping label, from information transferred to the carrier (such as by an online shipping system) from the shipper, or combinations of these sources. The carrier assigns the class of service requested by the shipper, so long as it is valid and available, and assigns an expected or scheduled delivery date based on the class of service and the location of the destination. At Step 706, the carrier determines from the shipping information one or more shipping routes to transport each item from the shipper to the recipient. Each route includes an origination ("ORIG"), a destination ("DEST"), and possibly one or more intermediate locations that the item will pass through on its journey from the shipper to the destination as well as certain time intervals for each scan or read to occur such that the item will be delivered on the expected date. When the item is received and as it passes through the intermediate locations on its way to the destination, and when it is delivered to the recipient, the package is tracked by reading or scanning its package tracking number as it passes through these various locations. The package tracking number along with the location and date and time of each scan or read is stored in a tracking database. At Step 708, the carrier selects a preferred route from those one or more planned routes determined in Step 706. The item is to be shipped using this preferred route unless exceptions occur during shipment. If there are other planned routes that are not chosen as the preferred route, these un-chosen routes will be considered alternate routes.

At Step 710, the carrier proceeds to transport the item along the preferred route and at Step 712, the item's machine-readable indicia or device is scanned or read at each location the item passes through on its way to the recipient. The location and time at which the item is scanned or read is compared to locations and time intervals determined for the preferred route. At Step 714, it is determined whether the actual locations where the item was scanned or read corresponds to the locations and time intervals identified in the preferred route. If, at Step 714, the item was scanned at a location identified in the preferred route and at a time within the designated time interval for that location, the process goes to Step 716 where it is determined whether the most recent (i.e., last) scan was at the destination. If the last scan was at the destination, then the process ends at Step 718 as the item is delivered. If the most recent scan was not at the destination, then the process returns to Step 710 and the item continues on its transport from the shipper to the destination.

If, at Step 714, the item was scanned or read at a location not identified in the preferred route or if it was scanned outside the designated time interval for a location, or if the item is not scanned or read at an expected location, then in Step 720 the item is flagged for investigation and possible alert to the shipper, recipient and/or authorized third parties. The process ends at Step 718.

Figure 8:
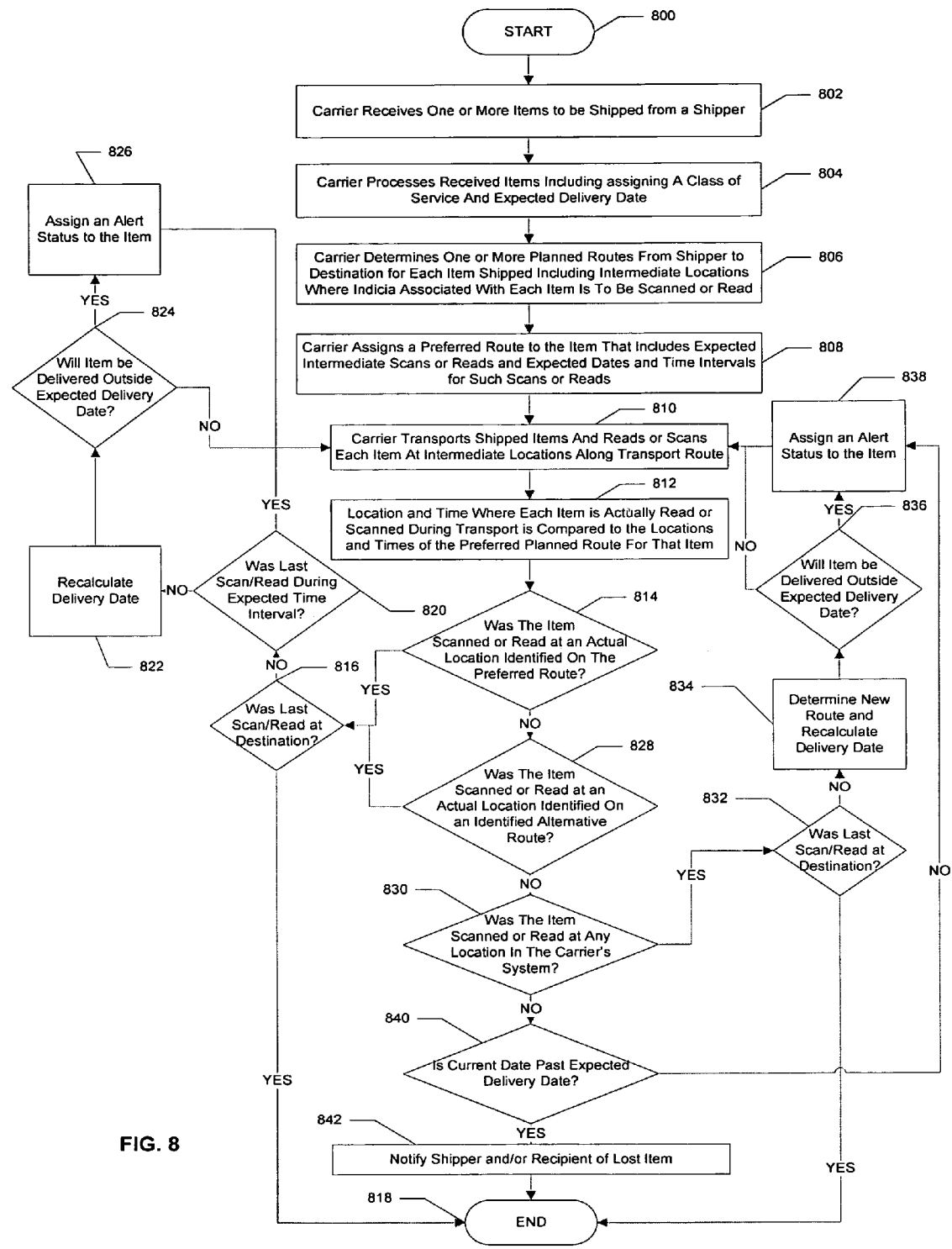
FIG. 8 is a flow chart that illustrates another method involved in one embodiment of the invention for providing enhanced visibility of items shipped via a carrier.

FIG. 8 is a flow chart that illustrates another method involved in one embodiment of the invention for providing enhanced visibility of items shipped via a carrier. The process begins at Step 800. At Step 802, a carrier receives one or more items (e.g., packages) from a shipper that are to be shipped to a destination. The items may have a shipping label pre-affixed that provides shipping information to the carrier, where such shipping information may include the shipper's name and address, the class of service, the weight of the item to be shipped, the recipient's name and address, etc. Also affixed to the item or incorporated into the shipping label is some form of machine-readable indicia or device such as a barcode or an RFID transponder that contains at least an encoded package tracking number. In other instances, the shipping label is attached to the item by the carrier once it is received from the shipper. At Step 804, the carrier processes the received items to be shipped by obtaining shipping information from the shipping label, from information transferred to the carrier (such as by an online shipping system) from the shipper, or combinations of these sources. The carrier assigns the class of service requested by the shipper, so long as it is valid and available, and assigns an expected delivery date based on the class of service and the location of the destination. At Step 806, the carrier determines from the shipping information one or more shipping routes to transport each item from the shipper to the recipient. Each route includes an origination ("ORIG"), a destination ("DEST"), and possibly one or more intermediate locations that the item will pass through on its journey from the shipper to the destination as well as certain time intervals for each scan or read to occur such that the item will be delivered on the expected date. When the item is received and as it passes through the intermediate locations on its way to the destination, and when it is delivered to the recipient, the package is tracked by reading or scanning its package tracking number as it passes through these various locations. The package tracking number along with the location and date and time of each scan or read is stored in a tracking database. At Step 808, the carrier selects a preferred route from those one or more planned routes determined in Step 806. The item is to be shipped by the carrier using this preferred route unless exceptions occur during shipment. If there are other planned routes that are not chosen as the preferred route, these un-chosen routes will be considered alternate routes.

At Step 810, the carrier proceeds to transport the item along the preferred route and at Step 812, the item's machine-readable indicia or device is scanned or read at each location the item passes through on its way to the recipient. The location and time at which the item is scanned or read is compared to locations and time intervals determined for the preferred route. At Step 814, it is determined whether the actual locations where the item was scanned or read corresponds to the locations identified in the preferred route. If, at Step 814, the item was scanned at a location identified in the preferred route, the process goes to Step 816 where it is determined whether the most recent (i.e., last) scan was at the destination. If the last scan was at the destination, then the process ends at Step 818 as the item is delivered. If it is determined at Step 816 that the most recent scan was not at the destination, then the process goes to Step 820 where it is determined whether the most recent scan or read occurred during the predetermined expected time interval for that location. If, at Step 820, it is determined that the most recent scan or read occurred in its predetermined time interval, then the process goes to Step 810 and the item continues on its transport from the shipper to the destination. Referring back to Step 820, if at Step 820 it is determined that the last scan or read did not occur within the predetermined expected time interval for that location, then at Step 822 the delivery date for that item is recalculated and the process moves on to Step 824. At Step 824, it is determined from the recalculated delivery date of Step 822 whether the item will be delivered outside its originally-scheduled delivery date. If the item will be delivered outside its originally-scheduled delivery date, then at Step 826, an alert status is assigned to the item wherein such alert status may be visible to the shipper, recipient and other authorized/interested parties. The process then continues to Step 810 and the item continues on its transport from the shipper to the destination. If, at Step 824 it is determined that the item will still be delivered on its originally-scheduled delivery date, then the process continues to Step 810 and the item continues on its transport from the shipper to the destination.

Referring back to Step 814, if, at Step 814, the item was scanned at a location that is not identified in the preferred route, the process goes to Step 828. At Step 828, it is determined whether the item was scanned at a location that is identified in one of the alternative routes as determined in Step 808. If, at Step 814, the item was scanned at a location identified in an alternate route, the process goes to Step 816 where it is determined whether the most recent (i.e., last) scan was at the destination. If the last scan was at the destination, then the process ends at Step 818 as the item is delivered. If it is determined at Step 816 that the most recent scan was not at the destination, then the process goes to Step 820 where it is determined whether the most recent scan or read occurred during the predetermined expected time interval for that location. If, at Step 820, it is determined that the most recent scan or read occurred in its predetermined time interval, then the process goes to Step 810 and the item continues on its transport from the shipper to the destination. Referring back to Step 820, if at Step 820 it is determined that the last scan or read did not occur within the predetermined expected time interval for that location, then at Step 822 the delivery date for that item is recalculated and the process moves on to Step 824. At Step 824, it is determined from the re-calculated delivery date of Step 822 whether the item will be delivered outside its originally-scheduled delivery date. If the item will be delivered outside its originally-scheduled delivery date, then at Step 826, an alert status is assigned to the item wherein such alert status may be visible to the shipper, recipient and other authorized/interested parties. The process then continues to Step 810 and the item continues on its transport from the shipper to the destination. If, at Step 824 it is determined that the item will still be delivered on its originally-scheduled delivery date, then the process continues to Step 810 and the item continues on its transport from the shipper to the destination.

Referring back to Step 828, if it is determined that the last scan did not occur at any location identified in an alternative route for the item, then at Step 830 it is determined whether the items was scanned or read at any location in the carrier's system. If at Step 830 the item was scanned at a location in the carrier's system, then the process goes to Step 832 where it is determined whether the most recent scan or read was at the destination. If at Step 832 the most recent scan or read was at the destination, then the process ends at Step 818 as the item is delivered. If it is determined at Step 832 that the most recent scan was not at the destination, then the process goes to Step 834 where, based on the location of the most recent scan or read, a new route is determined and the expected delivery date is recalculated. The process then moves to Step 836 where it is determined from the re-calculated delivery date of Step 834 whether the item will be delivered outside its originally-scheduled delivery date. If the item will be delivered outside its originally-scheduled delivery date, then at Step 838, an alert status is assigned to the item wherein such alert status may be visible to the shipper, recipient and other authorized/interested parties. The process then continues to Step 810 and the item continues on its transport from the shipper to the destination. If, at Step 836 it is determined that the item will still be delivered on its originally-scheduled delivery date, then the process continues to Step 810 and the item continues on its transport from the shipper to the destination.

Referring back to Step 830, if the item was not scanned or read at any location in the carrier's system within a certain (defined) time period, then the process moves on to Step 840 where it is determined whether the current date is past the expected delivery date. If the current date is past the expected delivery date then at Step 842 the shipper, the recipient and authorized/interested third parties are notified that the item may be lost. The process ends at Step 818. If, however, at Step 840, the current date is not past the expected delivery date, then the process goes to Step 838 where an alert is assigned to the item and the process continues to Step 810. The system of the invention will continue to "look" for a scan or read of the item until the current date is past the expected delivery date as determined in Step 840.

Thus, the embodiments of the present invention describe systems and methods for the utilizing a predetermined set of expected occurrences for an item to detect one or more non-occurrences of the predetermined set and thus providing additional visibility about the affected item in addition to the events that have happened. This increased visibility, in the context of parcel delivery services, allows shippers, recipients, carriers and third-parties to make remedial efforts to investigate and correct the non-occurrence or to prepare alternate plans based on the severity and affect of the non-occurrence. Generally, parcel service delivery tracking systems are event driven and provide only information of events that have happened such as the receipt, and intermediate scans/reads of a parcel in-route to a recipient. The systems and methods of the embodiments of the invention increase that visibility by providing information as to whether the item is on its preferred route and whether delivery may be or is affected.

Many modifications and other embodiments of the inventions set forth herein will come to mind to one skilled in the art to which these inventions pertain having the benefit of the teachings presented in the foregoing descriptions and the associated drawings. Therefore, it is to be understood that the That which is claimed:

1. A computer system for providing enhanced visibility of shipped items shipped via a carrier, said computer system comprising:
   one or more event-based tracking systems comprising at least one or more of a barcode scanner or a radio frequency identification (RFID) reader, the event-based tracking systems configured to obtain information about shipped items;
   a global tracking/data repository comprising a mainframe-computer or a server, the global tracking/data repository configured to receive said information from said event-based tracking systems;
   a visibility engine configured to provide at least a portion of said information to at least a shipper or a recipient of one or more shipped items over a network;
   a package routing module configured to determine: a preferred delivery route and an alternate delivery route for the transport of the shipped items from the shipper to the recipient via the carrier; and an expected delivery date for each shipped item, wherein:
   the routes are determined by the package routing module prior to the transport of the shipped items and
   each route is comprised of one or more intermediate locations, and; a non-occurrence exceptions module, wherein:
   the non-occurrence exceptions module is configured to monitor the routes of each shipped item in transport by the carrier and assign a status to each shipped item based on an event occurring at said one or more intermediate locations;
   said non-occurrence exceptions module configured to communicate said status to the visibility engine to provide enhanced visibility of the shipped items; and
   the non-occurrence exceptions module is configured for, in response to determining that the item was not scanned by a first scanning device at an intermediate location that is identified in said preferred delivery route determining whether at least one of said shipping items was scanned at an intermediate location that is identified in said alternate delivery route.

2. The system of claim 1, wherein the event occurring at said one or more intermediate locations is one of the following: one of said shipped items arriving outside a predetermined time window at one of said intermediate locations or one of said shipped items arriving at a location that is not identified as one of said intermediate locations.

3. The system of claim 2, wherein said package tracking module is able to determine a new route from said location that is not identified as one of said intermediate locations to said recipient and a new delivery date when said event is where one of said shipped items arrives at a location that is not identified as one of said intermediate locations.

4. The system of claim 1, wherein the status indicates whether said each shipped item (a) is on schedule to be delivered to the recipient on the expected delivery date; (b) may potentially have its delivery to the intended recipient delayed beyond the expected delivery date; or (c) will have its delivery delayed beyond the expected delivery date.

5. The system of claim 1, wherein the network for the visibility engine to provide at least a portion of said information to at least the shipper or the recipient of one or more shipped items is the Internet.

6. The system of claim 1, wherein the package routing module determines the time in transit between each intermediate location of the routes for the transport of the shipped items from the shipper to the recipient in order to determine the expected delivery date for each shipped item.

7. The system of claim 1, wherein the barcode scanner is configured to scan barcodes associated with shipped items and the RFID reader is configured to read RFID transponders associated with shipped items.

8. The system of claim 1, wherein the server is configured to receive said information from said event-based tracking systems.

9. The system of claim 1, wherein the mainframe-computer is configured to receive said in formation from said event-based tracking systems.

10. The system of claim 1, wherein the intermediate location is a location between an origin location and a destination location along a delivery route for the at least one shipping item.

11. The system of claim 1, wherein the non-occurrence exceptions module is configured to detect that the event occurring at said one or more intermediate locations occurs in response to:
   (A) at least one of said shipping items failing to depart a corresponding intermediate location during a departure time interval assigned to the intermediate location; and
   (B) information associated with the at least one shipping item not being retrieved, by the first scanning device, upon expiration of a time associated with the departure time interval.

12. The system of claim 1, wherein the non-occurrence exceptions module is configured for, in response to the non-occurrence exceptions module determining that the item was scanned by a second scanning device at the intermediate location identified in the alternate delivery route, determining whether a most recent scan of the item occurred at a destination in which the item is delivered.

13. The system of claim 12, wherein the non-occurrence exceptions module is configured for, in response to the non-occurrence exceptions module determining that the most recent scan of the item did not occur within a predetermined expected time interval associated with the intermediate location identified in the alternate delivery route, determining a new delivery date for the item and determine whether the item will be delivered after the expected delivery date.

14. A method for providing enhanced visibility of shipped items shipped via carrier, said method comprising:
   obtaining, via a computer processor, information about shipped items;
   receiving, via the computer processor, said information from one or more event-based tracking systems;
   providing, via the computer processor, at least a portion of said information to at least a shipper or a recipient of one or more shipped items over a network;
   determining, via the computer processor, (A) a preferred delivery route and an alternate delivery route for the transport of the shipped items from the shipper to the recipient via the carrier and (B) an expected delivery date for each shipped item, wherein:
   (A) the routes are determined prior to the transport of the shipped items and
   (B) each route is comprised of one or more intermediate locations;

monitoring, via the computer processor, the routes of each shipped item in transport by the carrier;

assigning, via the computer processor, a status to each shipped item based on an event occurring at said one or more intermediate locations, said computer processor communicating said status to a visibility engine to provide enhanced visibility of the shipped items; and determining whether at least one of the shipped items was scanned at an intermediate location that is identified in the alternate delivery route in response to determining that the item was not scanned by a first scanning device at an intermediate location that is identified in the preferred delivery route.

15. The method of claim 14, wherein the event occurring at said one or more intermediate locations is one of the following: one of said shipped items arrival outside a predetermined time window at one of said intermediate locations, or one of said shipped items arriving at a location that is not identified as one of said intermediate locations.

16. The method of claim 14, wherein the status indicates whether said each shipped item (a) is on schedule to be delivered to the recipient on the expected delivery date; (b) may potentially have its delivery to the intended recipient delayed beyond the expected delivery date; or (c) will have its delivery delayed beyond the expected delivery date.

17. The method of claim 14, wherein the intermediate location is a location between an origin location and a destination location along a delivery route for the at least one shipping item.

18. The method of claim 14, wherein the event occurring at said one or more intermediate locations occurs in response to:
    (A) at least one of the shipped items failing to depart a corresponding intermediate location during a departure time interval assigned to the intermediate location; and
    (B) in response to information associated with the at least one shipping item not being retrieved, by the first scanning device, upon expiration of a time associated with the departure time interval.

19. The method of claim 14, wherein the method further comprises the step of, in response to determining that the item was scanned by a second scanning device at the intermediate location identified in the alternate delivery route, determining whether a most recent scan of the item occurred at a destination in which the item is delivered.

20. The method of claim 19, wherein the method further comprises the step of, in response to determining that the most recent scan of the item did not occur within a predetermined expected time interval associated with the intermediate location identified in the alternate delivery route, determining a new delivery date for the item and determining whether the item will be delivered after the expected delivery date.

21. An apparatus for providing enhanced visibility of shipped items via a carrier, comprising:
    a processor; and
    a memory in communication with the processor, said memory storing an application executable by the processor, wherein the application is configured upon execution, to:
        obtain information about shipped items;
        receive said information from one or more event-based tracking systems;
        provide at least a portion of said information to at least a shipper or a recipient of one or more shipped items over a network;
        determine a preferred delivery route and an alternate delivery route for the transport of the shipped items from the shipper to the recipient via the carrier and an expected delivery date for each shipped item, wherein the routes are determined prior to the transport of the shipped items and each route is comprised of one or more intermediate locations;
        monitor the routes of each shipped item in transport by the carrier and assign a status to each shipped item based on an event occurring at said one or more intermediate locations and communicate said status to provide enhanced visibility of the shipped items; and
        determine whether the at least one of said shipping items was scanned at an intermediate location that is identified in the alternate delivery route in response to determining that the item was not scanned by a first scanning device at an intermediate location that is identified in the preferred delivery route.

22. The apparatus of claim 21, wherein the intermediate location is a location between an origin location and a destination location along a delivery route for the at least one shipping item.

23. The apparatus of claim 21, wherein the application is further configured, upon execution by the processor, to:
    detect that the event occurring at said one or more intermediate locations occurs in response to at least one of said shipping items failing to depart a corresponding intermediate location during a departure time interval assigned to the intermediate location and in response to information associated with the at least one shipping item not being retrieved, by the first scanning device, upon expiration of a time associated with the departure time interval.

24. The apparatus of claim 21, wherein the application is further configured, upon execution by the processor, to:
    determine whether a most recent scan of the item occurred at a destination in which the item is delivered in response to determining that the item was scanned by a second scanning device at the intermediate location identified in the alternate delivery route.

25. The apparatus of claim 24, wherein the application is further configured upon execution by the processor, to:
    determine a new delivery date for the item and determine whether the item will be delivered after the expected delivery date in response to determining that the most recent scan of the item did not occur within a predetermined expected time interval associated with the intermediate location identified in the alternate delivery route.

* * * * *